(12) United States Patent
Akatsuka et al.

(10) Patent No.: US 9,796,410 B2
(45) Date of Patent: Oct. 24, 2017

(54) MOTOR CONTROLLER

(71) Applicant: DENSO CORPORATION, Kariya, Aichi-pref. (JP)

(72) Inventors: Hisaya Akatsuka, Kariya (JP); Motoaki Kataoka, Kariya (JP); Daisuke Tokumochi, Kariya (JP); Yasuhiko Mukai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/009,451

(22) Filed: Jan. 28, 2016

(65) Prior Publication Data

US 2017/0217477 A1    Aug. 3, 2017

(51) Int. Cl.
*B62D 6/00* (2006.01)
*B62D 5/04* (2006.01)
*B62D 6/02* (2006.01)
*G05B 19/402* (2006.01)

(52) U.S. Cl.
CPC ........... *B62D 5/0463* (2013.01); *B62D 6/002* (2013.01); *B62D 6/02* (2013.01); *G05B 19/402* (2013.01)

(58) Field of Classification Search
USPC .......................................................... 701/42
See application file for complete search history.

(56) References Cited

U.S. PATENT DOCUMENTS

| 6,212,453 B1 | 4/2001 | Kawagoe et al. |
| 2002/0013647 A1 | 1/2002 | Kawazoe et al. |
| 2002/0016657 A1 | 2/2002 | Iwazaki |
| 2003/0014162 A1 | 1/2003 | Sadano |
| 2003/0078712 A1 | 4/2003 | Shimakage et al. |
| 2006/0198626 A1 | 9/2006 | Nakamura et al. |
| 2006/0235598 A1 | 10/2006 | Kudo |
| 2007/0288142 A1 | 12/2007 | Maeda et al. |
| 2009/0024278 A1* | 1/2009 | Kondo ..................... B62D 1/28 701/41 |
| 2010/0100284 A1* | 4/2010 | Kudo .................. B62D 15/025 701/42 |
| 2011/0257845 A1 | 10/2011 | Niki et al. |

(Continued)

FOREIGN PATENT DOCUMENTS

| EP | 2 213 546 A1 | 8/2010 |
| JP | H07-251754 A | 10/1995 |

(Continued)

*Primary Examiner* — Tyler Paige
(74) *Attorney, Agent, or Firm* — Knobbe, Martens, Olson & Bear, LLP

(57) ABSTRACT

A motor controller has an assist controller that generates an assist instruction AC to generate an assist torque for lightening a steering load based on a detected value of a steering torque, and a follow controller obtaining a target value of a physical quantity regarding a steering operation and generating a follow instruction TC of a follow control. Further, an intervention detector in the motor controller detects an intervention of a driver or of a system, and a restrictor restricts an internal value that is used by the assist controller or by the follow controller, so that a ratio of the assist torque against the automatic steering torque is changed, which makes it possible to switch a control to the driver or to a system without a causing a wrong feeling to the driver.

14 Claims, 28 Drawing Sheets

(56) References Cited

U.S. PATENT DOCUMENTS

| | | | |
|---|---|---|---|
| 2012/0029773 A1* | 2/2012 | Fujita | B60W 30/12 701/41 |
| 2012/0123643 A1 | 5/2012 | Limpibuntering et al. | |
| 2012/0283910 A1* | 11/2012 | Lee | B62D 1/286 701/41 |

FOREIGN PATENT DOCUMENTS

| | | |
|---|---|---|
| JP | H09-207800 A | 8/1997 |
| JP | H09-221053 A | 8/1997 |
| JP | H09-221054 A | 8/1997 |
| JP | H11-208494 A | 8/1999 |
| JP | 2002-19633 A | 1/2002 |
| JP | 2002-29437 A | 1/2002 |
| JP | 2002-67998 A | 3/2002 |
| JP | 2002-120744 A | 4/2002 |
| JP | 2002-302508 A | 10/2002 |
| JP | 2003-081115 A | 3/2003 |
| JP | 2004-149060 A | 5/2004 |
| JP | 2004-256076 A | 9/2004 |
| JP | 2005-161946 A | 6/2005 |
| JP | 2006-298009 A | 11/2006 |
| JP | 2008-013123 A | 1/2008 |
| JP | 2010-105634 | 5/2010 |
| JP | 2010-188854 A | 9/2010 |
| JP | 2010-188917 | 9/2010 |
| JP | 2010-188917 A | 9/2010 |
| JP | 2010-195088 A | 9/2010 |
| JP | 2012-166720 A | 9/2012 |
| JP | 2015-020604 A | 2/2015 |

* cited by examiner

MOTOR CONTROLLER

CROSS REFERENCE TO RELATED APPLICATION

The present application is based on Japanese Patent Application No. 2013-150502, filed on Jul. 19, 2013, the disclosure of which is incorporated herein by reference.

TECHNICAL FIELD

The present disclosure generally relates to a technique that controls a motor for generating an assist torque for assisting a steering operation and an automatic steering torque for automatically steering a steering wheel.

BACKGROUND INFORMATION

A device disclosed in, for example, a patent document, Japanese Patent Laid-Open No. H09-221053 (Patent document 1) uses one actuator (i.e., a motor) to perform a lane keep control and a power steering control, in which (i) the lane keep control keeps a currently traveling lane (i.e., a travel along a current lane) for a subject vehicle based on an image captured by a forward-looking camera and a recognition of a relationship between the current lane and the subject vehicle and (ii) the power steering control generates the assist torque for assisting the steering operation by a driver.

The above-described device basically performs a drive control of the motor based on a total torque of a power steering torque required for the power steering control and a lane keep torque required for the lake keep control. However, during the lane keep control, an influence of the power steering control is suppressed by multiplying a coefficient, which is between 0 and 1, to the power steering torque, so that the subject vehicle does not easily run away (i.e., "derailed") from the current lane.

When the driver interrupts the lane keep control (i.e., performs an intervening action or a so-called driver override), an actual position and an actual angle of the subject vehicle against a target position and a target angle that are set by the lane keep control respectively increase (i.e., have greater deviations), thereby causing a deviation cancelling toque to be generated by the lane keep control.

Further, the lane keep control has higher responsiveness in comparison to an assist control for coping with an external disturbance (i.e., either for ensuring a robustness or for providing a quick steering, in an order of 1 to 100 Hz (against a 0.1 Hz order of the assist control)).

However, a high responsiveness of the lane keep control may be disruptive to the driver, because the cancelling torque for cancelling the deviation by the driver override may counter the driver's operation of the steering wheel, thereby leaving a wrong feeling for the driver.

Further, when a system intervenes the steering operation by the driver, (e.g., when a danger-avoidance target follow control is performed by the system), high responsiveness of the target follow control may also leave a wrong feeling for the driver because the highly-responsive target follow control automatically steers the steering wheel toward a target control value of the target follow control in an abrupt manner. The target follow control may simply be designated as a follow control in the following description.

SUMMARY

It is an object of the present disclosure to provide a motor controller that switches, without leaving a wrong feeling for a driver, a control of a motor for generating an assist torque and an auto steering torque when a driver or a system intervenes in a current control of the motor.

In an aspect of the present disclosure, a motor controller includes an assist controller generating an assist instruction to generate an assist torque that lightens a manual steering load based on a detected value of a steering torque, and a follow controller obtaining a target value of a physical quantity of a steering operation and controlling a detected value of the physical quantity to follow the target value. The following is achieved by sending a follow instruction to a motor to output an auto-steering torque from the motor. The motor controller also includes a motor driver driving, according to a summation value of the assist instruction and the follow instruction, the motor that generates the assist torque and the auto-steering torque. The motor controller further includes an intervention detector detecting a driver intervention in a follow control, or a system intervention in an assist control by a system that is involved in a generation of the target value of the physical quantity. The motor controller further includes a restrictor restricting an internal value in a controlee that comprises at least one of the assist controller and the follow controller. According to a degree of the driver intervention detected by the intervention detector, the restriction of the internal value causing a change of ratio of the assist torque against the auto-steering torque.

The intervention detector detects a driver intervention (i.e., an intervention in a system control by a driver), or a system intervention (i.e., an intervention in a driver control by a system). The restrictor is disposed in a restriction object, which may be at least one of the assist controller and the follow controller, and restricts an internal value that is used in the restriction object for changing a ratio of the assist torque against the automatic steering torque according to a degree of intervention which is detected by the intervention determiner.

Usually, when the follow control by the follow controller has an intervention of the driver (i.e., receives an intervention operation or a "driver override"), the follow controller generated a great follow instruction for cancelling the intervention operation (i.e., for cancelling the torque from the intervention operation which counters the automatic steering torque). Therefore, the higher the responsiveness of the target follow control is, it is more difficult for the driver to perform an intervention operation.

On the other hand, in the present disclosure, when the intervention operation by the driver is detected, a ratio of the assist torque against the automatic steering control is increased, thereby preventing a generation of a great follow instruction that counters the intervention operation. As a result, when the driver performs the intervention operation, the follow control transitions to the assist control without leaving a wrong feeling for the driver.

Further, in the target follow control, an integration function is employed for a following of the detected value to the target value. Therefore, when an intervention operation is performed, an integration of the internal value is quickly performed, for countering (i.e., for cancelling) the intervention operation. Even though, for a protection of a motor driver circuit and a motor itself, the follow instruction is restricted by setting an upper limit value, the integration of the internal value is performed without such restriction, which may generate a so-called wind-up. That is, even when the intervention operation for decreasing the integral value is performed, during a period in which the integral value falls down to be equal to or to be lower than upper limit value of the follow instruction, an output of the upper limit value (i.e., an output of an excessive automatic steering torque) continues, thereby leaving a wrong steering feeling for the driver.

In the present disclosure, for such a situation, the integration of the internal value is restricted, and the wind-up in an intervention operation time is prevented, thereby quickly realizing a driver intended steering operation. In such case, the integration function includes not only a function provided by an integration circuit, but also a function provided by a low pass filter and a function provided by a transfer function that includes a 1/s factor.

The numerals in the claims enclosed in parentheses exemplify a relationship between the claim elements and the concrete components in the embodiment, thereby not limiting the scope of the present disclosure.

The present disclosure may be applicable and realizable in various forms besides the motor controller, such as a system including a motor controller, a program for controlling a computer to be serving as required elements of the motor controller, a motor controlling method and the like.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described based on the drawings.

First Embodiment

<Entire Configuration>

Figure 1:
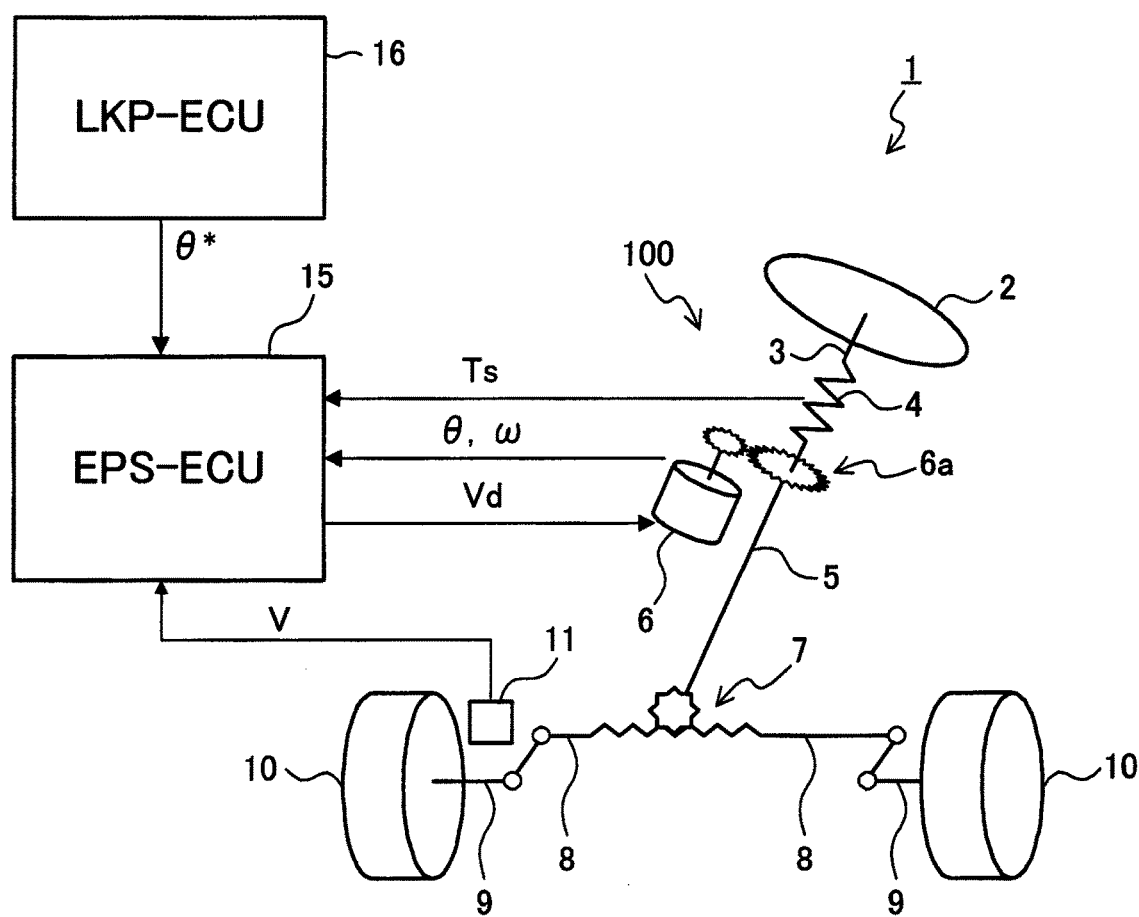
FIG. 1 is a block diagram of a configuration of an electric power steering system in the first embodiment of the present disclosure.

An electric power steering system 1 of the present embodiment is a system, as shown in FIG. 1, for performing an assist control that assists an operation of a steering wheel 2 (i.e., a steering member) by the driver with a motor 6, and/or a target follow control (i.e., Lane Keeping Control (LKC)) that realizes an automatic steering by the motor 6 along a target course set in a travel lane.

The steering wheel 2 is fixed to one end of a steering shaft 3, a torque sensor 4 is connected to the other end of the steering shaft 3, and an intermediate shaft 5 is connected to the other end of the torque sensor 4. In the following description, an entirety from the steering shaft 3 to the intermediate shaft 5 through the torque sensor 4 may collectively be called as a steering shaft.

The torque sensor 4 is a sensor for detecting a steering torque Ts. More practically, the torque sensor 4 includes a torsion bar that connects the steering shaft 3 and the intermediate shaft 5, and the torque currently added to the torsion bar is detected based on an angle of torsion of the torsion bar.

The motor 6 is used for generating an automatic steering torque based on the target follow control and for generating the assist torque based on assist control, and the rotation of the motor 6 is transmitted to the intermediate shaft 5 via a deceleration mechanism 6a. Namely, the deceleration mechanism 6a is made up from the worm gear disposed at the tip of the rotation shaft of the motor 6 and the worm wheel disposed coaxially on the intermediate shaft 5 and engaging with the worm gear, for the transmission of the rotation of the motor 6 to the intermediate shaft 5.

On the contrary, when the intermediate shaft 5 rotates according to the reaction force from the road surface (i.e., a road surface reaction force), or according to an operation of the steering wheel 2, the rotation will be transmitted back to the motor 6 via the deceleration mechanism 6a, and the motor 6 is also rotated.

The motor 6 may be a brushless motor, for example, and has a rotation sensor (e.g., resolver) on an inside. The rotation sensor outputs at least a motor rotation angle θ and a motor rotation angular speed ω. However, instead of using the motor rotation angle θ and the motor rotation angular speed ω, a steering angle and a steering angular speed that are derived by multiplying the angle θ and the angular speed ω with a gear ratio of the deceleration mechanism 6a may also be used.

The other end of the intermediate shaft 5, which is opposite to the end connected to the torque sensor 4, is connected to a steering gear box 7. The steering gear box 7 is a gear system that consists of the rack and pinion gear, and the gear tooth of the rack gear engages with the pinion gear provided on the other end of the intermediate shaft 5.

Therefore, when the driver rotates the steering wheel 2, the intermediate shaft 5 rotates (i.e., the pinion gear is rotated), thereby causing a right-left move of the rack. Each of the both ends of the rack has a tie rod 8 connected to the end of the rack, and the tie rod 8 moves to the right and to the left together with the rack. Thereby, based on such a move of the tie rod 8 pulling a knuckle arm 9 on the end of the rod 8, the direction of each tire 10 is changed for the steering of the vehicle.

Further, a speed sensor 11 for detecting a vehicle speed V is provided on a predetermined part in the vehicle.

In the following, a steering force transmission mechanism from the steering wheel 2 to both of the tires 10 as a whole may be called as a steering mechanism 100.

In the steering mechanism 100 having such a configuration, when the steering wheel 2 rotates by the steering operation of the driver, the rotation is transmitted to the steering gear box 7 via the steering shaft 3, the torque sensor 4, and the intermediate shaft 5. Then, the rotation of the intermediate shaft 5 is changed into the right and left movement of the tie rod 8 in the steering gear box 7, and according to the movement of the tie rod 8, both of the tires 10 are steered.

Lane Keeping (LKP)-ECU 16 operates on an electric power from a non-illustrated battery, and based on a front image of the vehicle that is captured by a non-illustrated in-vehicle camera, detects the position of the self vehicle in the travel lane as well as the travel lane itself, and sets a target course based on the detection result.

Further, based on detection values of the vehicle speed and the steering angle, etc., a target angle θ* that is a target value of the motor rotation angle (or a steering angle) for traveling along the target course is set, and the target angle θ* is output to Electric Power Steering (EPS)-ECU 15. A process for setting such a target angle θ* is well-known in the art of the lane keeping control, and a detailed description of such process is omitted from the embodiment.

EPS-ECU 15 operates on an electric power of the in-vehicle battery (not illustrated), and calculates a final instruction TL that is derived from an addition of an assist instruction AC and a follow instruction TC based on the target angle θ* that is calculated by LKP-ECU 16, the steering torque Ts detected by the torque sensor 4, the motor rotation angle θ from the motor 6, the motor rotation angular speed ω, and the vehicle speed V detected by the speed sensor 11, among which the instruction AC is an electric current instruction value for generating the assist torque and the instruction TC is an electric current instruction value for generating the automatic steering torque.

That is, EPS-ECU 15 controls the steering characteristics by the control of the motor 6 based on the drive voltage Vd, and further controls the steering mechanism 100 that is driven by the motor 6.

[EPS-ECU]

Figure 2:
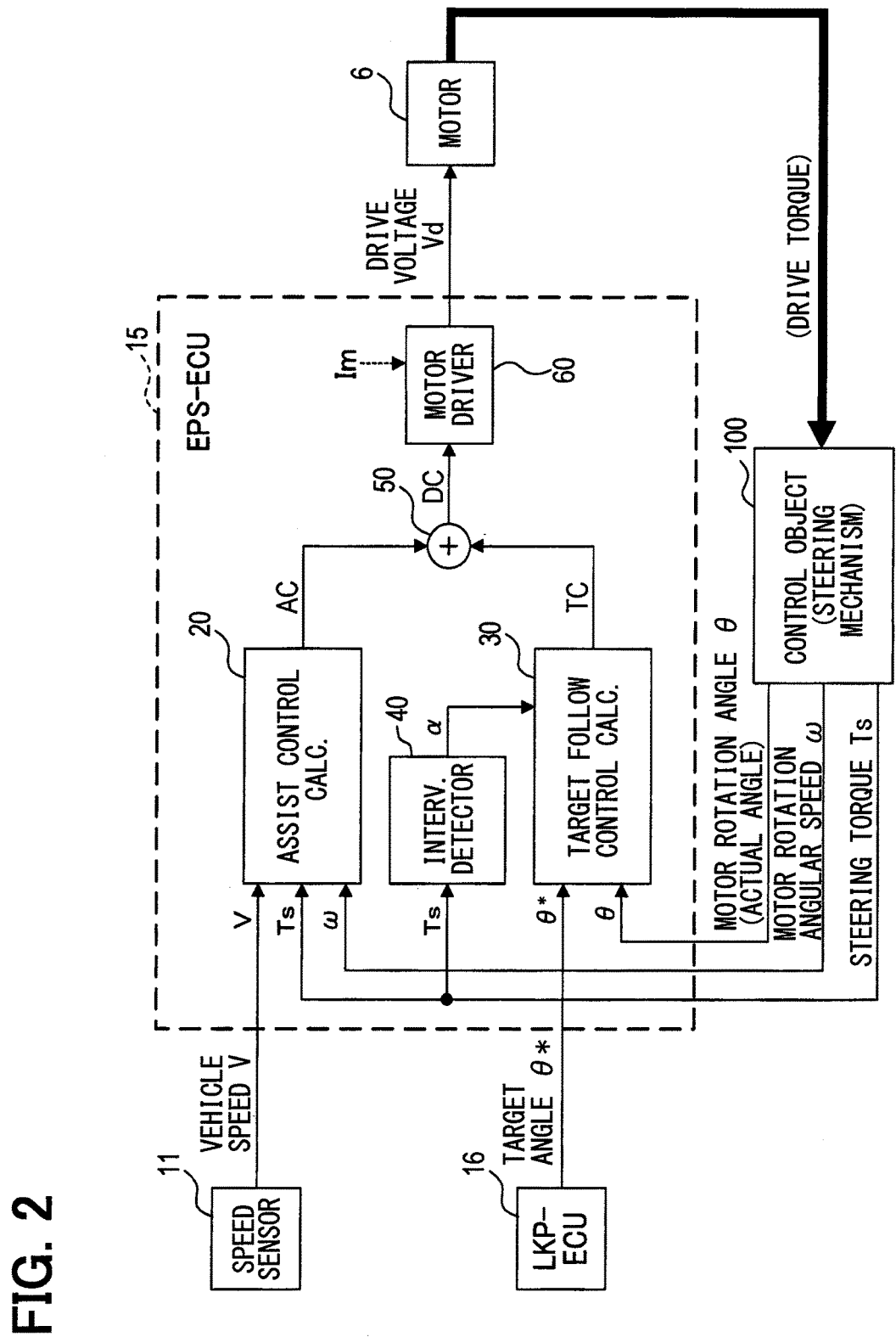
FIG. 2 is a block diagram of a configuration of EPS-ECU.

EPS-ECU 15 includes, as shown in FIG. 2, an assist control calculator 20 that generates the assist instruction AC, a target follow control calculator 30 that generates the follow instruction TC, and an intervention detector 40 that detects an intervention operation by the driver for intervening in the target follow control, an adder 50 that generates a drive instruction DC used as an electric current instruction value for driving the motor 6 by adding the assist instruction AC and the follow instruction TC, and a motor driver 60 (i.e., a driver circuit) that performs, based on the drive instruction DC, a power-supply drive of the motor 6 by applying the drive voltage Vd to the motor 6, which may be applied to each of the three phases when the motor 6 is a three-phase motor.

In the present embodiment, the assist control calculator 20, the target follow control calculator 30, the intervention detector 40, and the adder 50 are respectively realized by a control program that is executed by a Central Processing Unit (CPU) (not illustrated) in EPS-ECU 15. For securely providing responsiveness that is required for the target follow control (i.e., the lane keeping control), the control program is executed at a preset cycle of, for example, 100 μs to 100 ms (i.e., arbitrarily determined based on a requirement of the lane keeping control), and the drive instruction DC is updated at such a preset cycle. The above components realized by the software are only an example, and a part of those components may be realized by the hardware such as a logic circuit.

<<Motor Drive Circuit>>

Based on the drive instruction DC, the motor driver 60 (i.e., a driver circuit) applies the drive voltage Vd to the motor 6 so that the torque (i.e., the assist torque and the automatic steering torque) corresponding to the drive instruction DC is provided to the steering shaft.

More practically, by setting the drive instruction DC as the target value of the electric current, the drive voltage Vd is controlled by a feedback control, for the matching of a supplied electric current Im that is supplied to the motor 6 with the target value of the electric current, and for generating the desired torque for the steering shaft. The motor driver 60 operating in such manner is well-known in the art (e.g., as disclosed in a patent document JP 2013-52793 A), thereby details of such operation are omitted from the present embodiment.

<<Assist Control Calculator>>

The assist control calculator 20 generates the assist instruction AC that represents the electric current instruction value, for generating a feel of transmission of the steering torque according to a road surface reaction force and for generating a steering feel according to a steering state, based on the steering torque Ts, the motor rotation angular speed ω, and the vehicle speed V, so that the steering operation of the steering wheel 2 is assisted in the above-described manner by the resulting assist torque based on the instruction AC. More practically, a basic assist amount for the feel of transmission according to the road surface reaction force is calculated based on the steering torque Ts and the vehicle speed V, for example, and an assist compensation amount for the steering state is calculated based on the steering torque Ts and the motor rotation angular speed ω, and based on a gain-multiplied assist compensation amount, which may be calculated by multiplying the assist compensation amount by a gain factor in proportion to the vehicle speed V, the assist instruction AC is generated by adding the gain-multiplied assist compensation amount to the basic assist amount. However, a calculation method for calculating the assist instruction AC is not necessarily limited to such one. That is, the assist instruction AC may be calculated by any known method.

<<Intervention Detector>>

Figure 3:
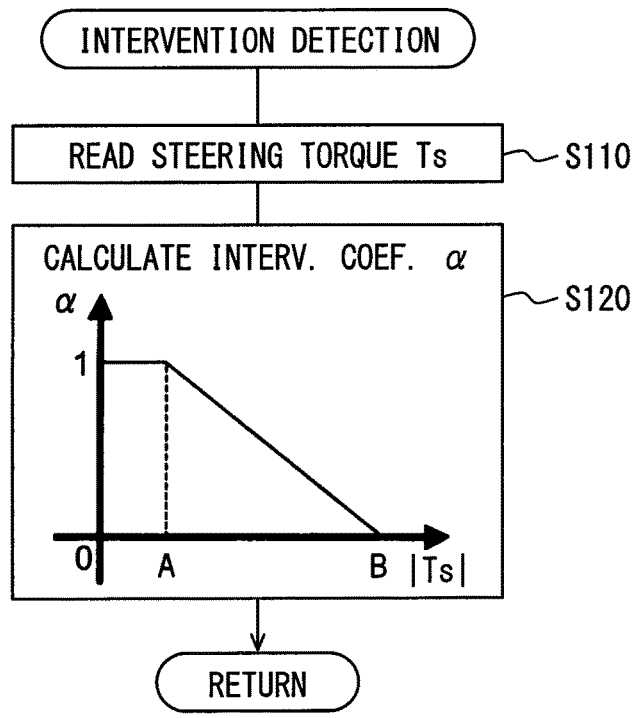
FIG. 3 is a flowchart a process performed by an intervention detector.

The intervention detector 40 reads, as shown in FIG. 3, the steering torque Ts (S110). When reading the torque Ts, the low pass filter (LPF) may be used for removing a noise other than driver intervention, such as a road surface disturbance or the like riding on the torque Ts, from the steering torque Ts.

Next, by using a predetermined conversion table, an intervention coefficient α according to an absolute value of the steering torque (i.e., |Ts|) is calculated (S120). The intervention detector 40 supplies the calculated intervention coefficient α to the target follow control calculator 30.

The conversion table outputs α=1 when |Ts|≤A, outputs α=0 when |Ts|≥B, and outputs a monotonic decreasing value between α=1 and α=0 according to an increase of |Ts| when A<|Ts|<B.

That is, the intervention detector 40 generates the intervention coefficient α having a smaller value when the absolute value of the steering torque |Ts| increases (i.e., when a degree of intervention in the steering control by the driver is greater).

A range |Ts|≤A defines a dead zone, which prevents a mis-detection of the driver intervention when, for example, the driver unintentionally touches the steering wheel or the like. The value B may, for example, be a threshold for a secure determination that the driver intervention (i.e., the steering torque), is in no doubt determinable as an intentional steering operation.

The absolute value of the steering torque |Ts| used as a parameter of the conversion table in the above discussion may be switched to the steering torque Ts itself, for which the conversion table is simply expanded in a symmetric manner against a Ts=0 axis. Further, for a range of A<|Ts|<B, the decreasing trend of the value of α may not necessarily be a linear decrease but may also be a quadric curve or other known methods.

<<Target Follow Control Calculator>>

Figure 4:
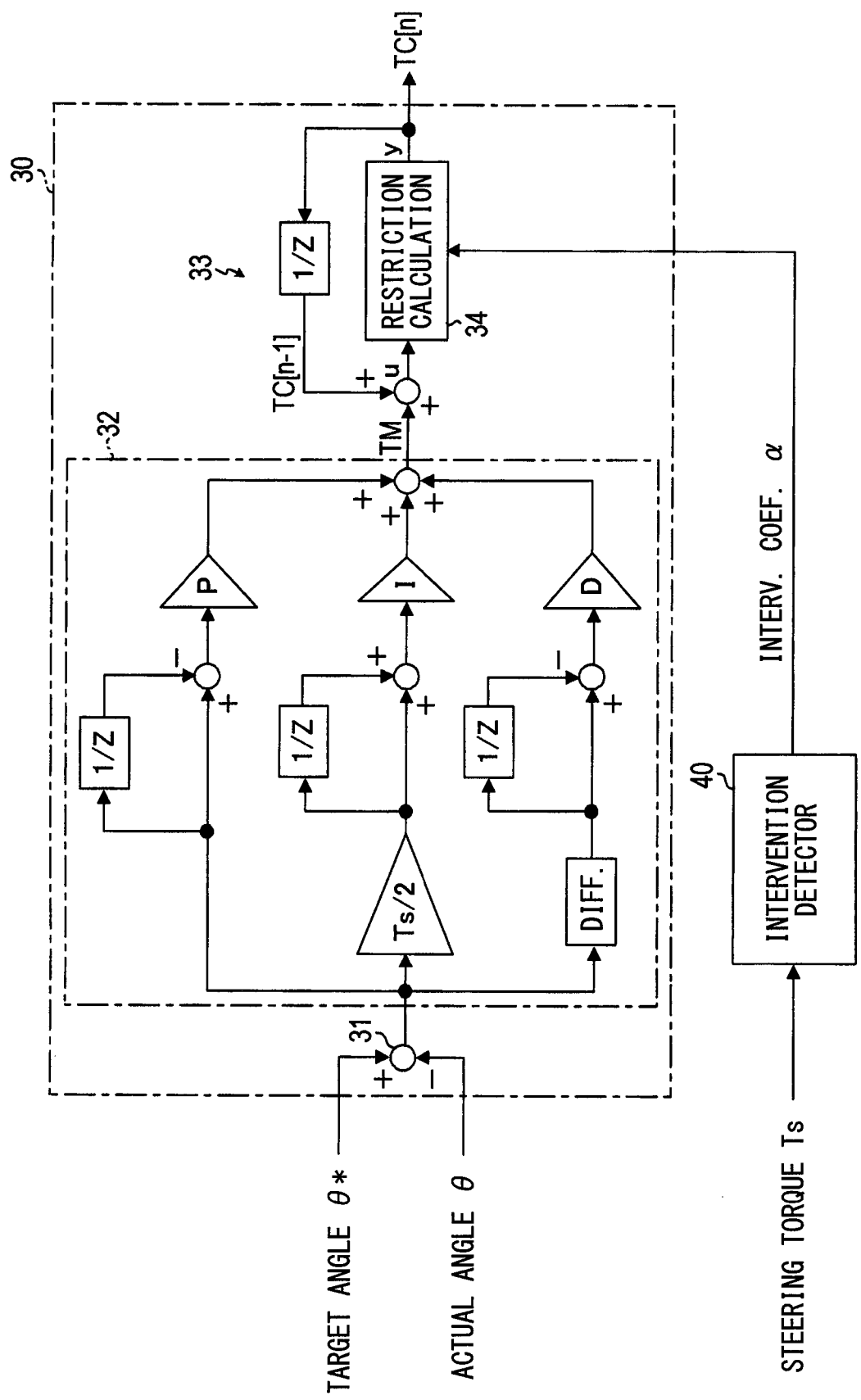
FIG. 4 is a block diagram of a target follow control calculator.

The target follow control calculator 30 generates the follow instruction TC representative of the electric current instruction value for generating the automatic steering torque required for "matching" (i.e., following or adjusting) a motor rotation angle (i.e., an "actual angle" θ hereafter) to the target angle θ* based on the target angle θ* and the actual angle θ, as shown in FIG. 4.

More practically, the target follow control calculator 30 has a subtractor 31 that calculates a deviation Δθ (=θ*−θ) derived by subtracting the actual angle from the target angle θ*, a characteristic determiner 32 that determines the control characteristic by providing a Proportional-Integral-Derivative (PID) gain to the deviation Δθ calculated by the subtractor 31, an integrator 33 that integrates an integration object value TM (i.e., an output of the characteristic determiner 32), and a restriction computer 34 that restricts the follow instruction TC by restricting an internal value used for the calculation in the target follow control calculator 30 according to the intervention coefficient α.

The characteristic determiner 32 and the integrator 33 perform a bilinear transformation for the discrimination of the general PID control equation, and for realizing a control structure based on the equation derived from such transformation, which is well-known in the art.

The restriction computer 34 is put in the integrator 33, to which a restriction object value u is provided as an output from an adder that adds the integration object value TM to a previous value TC[n−1] of the follow instruction, and a restricted the output y output from the restriction computer 34 then serves as a follow instruction TC[n].

Figure 5:
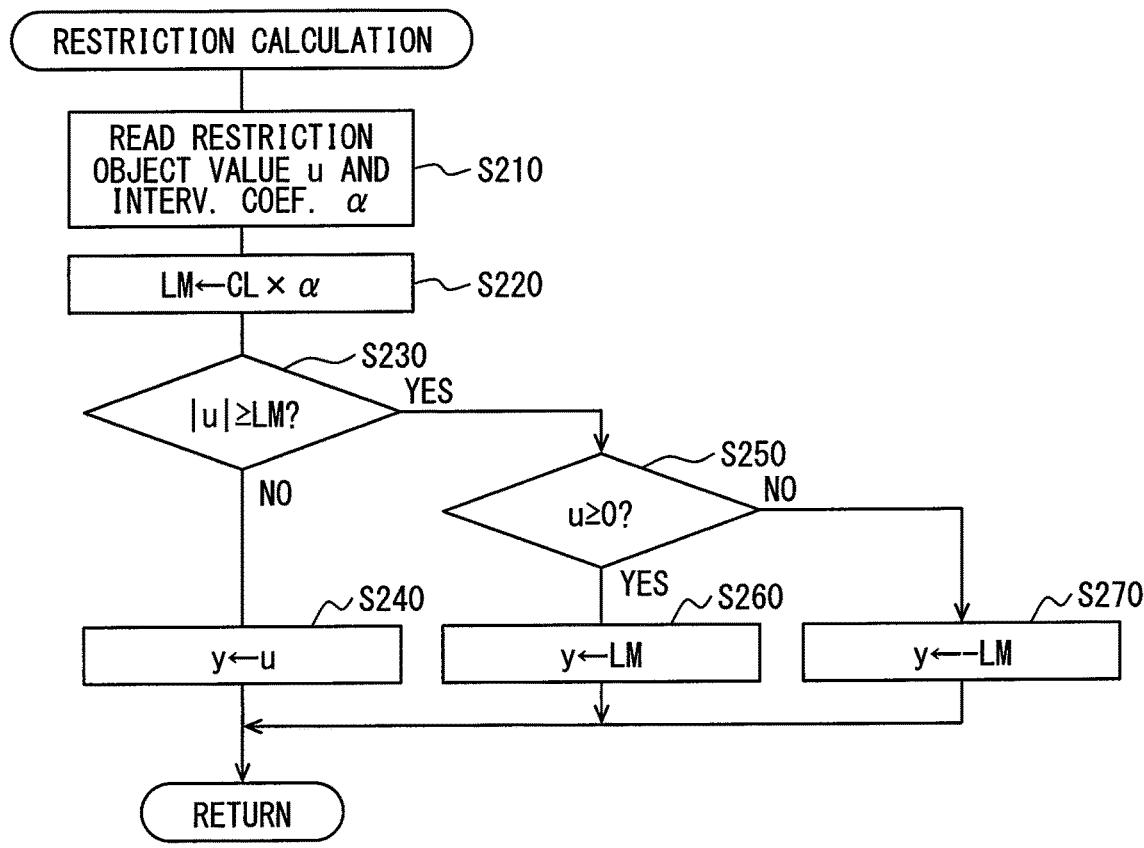
FIG. 5 is a flowchart of a process performed by a restriction computer.

Further, the restriction computer 34, as shown in FIG. 5, first reads the restriction object value u (i.e., an output of the adder constituting the integrator 33) and the intervention coefficient α (S210), and calculates a guard value LM by multiplying an upper limit value CL of the follow instruction which is set in advance by the intervention coefficient α (S220). The upper limit value CL is set as a rated electric current of the motor 6, for example.

Next, it is determined whether an absolute value |u| of the restriction object value is equal to or greater than guard value LM (S230). That is, it is determined whether the restriction object value u exceeds a boundary of −LM to LM range from the guard value, when a boundary value of an allowable range of the follow instruction TC is defined as the guard value ± LM.

When it is determined that the restriction object value u is within the allowable range (i.e., |u|<LM) (S230—NO), the restriction object value u is directly set as the output y (i.e., without restriction (S240)).

When it is determined that the restriction object value u is outside of allowable range (i.e., |u|≥LM) (S230—YES), it is determined whether the restriction object value u is a non-negative value (S250).

When it is determined that the restriction object value u is a non-negative value (S250—YES), the guard value (i.e., the upper limit of the allowable range) LM is set as the output y (S260). When the restriction object value u is a negative value (S250—NO), a negative guard value (i.e., the lower limit of the allowable range) −LM is set as the output y (S270).

<Operation>

Figure 6:
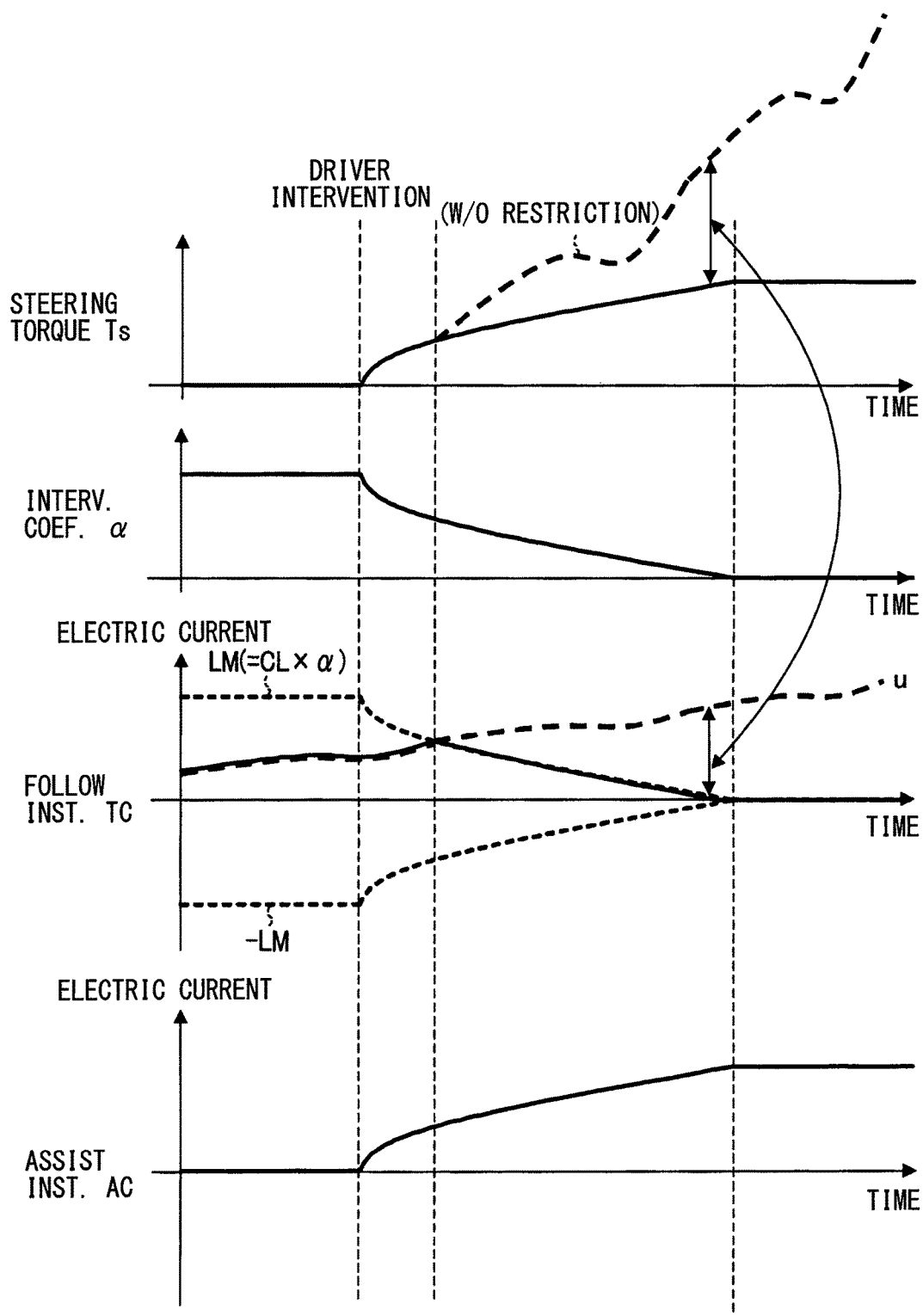
FIG. 6 is a wave form diagram of an example of operation of the restriction computer.

As shown in FIG. 6, in the electric steering system 1 configured in the above-described manner, when the target follow control (i.e., the lane keeping control) is performed, the follow instruction TC takes a value of non-zero (usually |TC|<LM). On the other hand, as long as the driver does not provide an intervention, the steering torque Ts and the assist instruction AC are maintained as Ts=0 and AC=0. In such case, since |Ts|<A, the intervention coefficient α is set to 1 (i.e., the allowable range of the follow instruction TC is maximized).

When the driver intervenes in the target follow control by operating the steering wheel 2, the steering torque Ts according to the degree of the intervention operation is generated, and a value of the intervention coefficient α is also changed according to the generated steering torque Ts, which further causes a change of the allowable range of the follow instruction TC.

In such case, if no restriction is performed for the follow instruction TC (i.e., if the restriction object value u is output without change as the output y, and as the follow instruction TC), the target follow control generates a large follow instruction TC for countering the intervention operation that acts as an increaser of the deviation as shown by a dotted line in FIG. 6, which obliges the driver to operate the steering wheel 2 with a strong force for overriding the follow control.

For avoiding such an uneasy situation, in the present embodiment, the greater the steering torque Ts is, the smaller the intervention coefficient α becomes (i.e., approaching to zero), thereby narrowing the allowable range of the follow instruction TC. In addition, when the absolute value of the restriction object value |u| increases beyond the boundary of the allowable range, the follow instruction TC is restricted to the guard value added scope of the allowable range (i.e., the allowable range ± LM). Further, when |Ts|>B, the intervention coefficient α and the follow instruction both become zero, which means that only the assist control is performed. Therefore, the driver does not have to exert an extra force for operating the steering wheel 2.

<Effect>

As described in the present embodiment, the electric steering system 1 decreases the follow instruction TC according to a degree of the intervention operation by the driver (i.e., according to a magnitude of the steering torque Ts, when the driver intervention is detected), for the prevention of the interference of the driver intervention with the assist instruction AC. Therefore, the intervention operation performed by the driver enables a smooth transition from the target follow control to the assist control without providing any wrong feeling for the driver.

Further, in the electric steering system 1, instead of directly restricting the follow instruction TC that is generated by the target follow control calculator 30, an internal value used in a calculation of the target follow control calculator 30 (i.e., an integral value of the integration calculation In such case) is restricted to be within the guard value LM, for the restriction of the follow instruction TC. Therefore, the wind-up in the integration calculation is prevented, thereby achieving a smooth intervention without leaving any wrong feeling.

Further, the follow instruction TC is prevented from taking a value that exceeds the guard value LM, eliminating an overflow concern in a software process, thereby guaranteeing a safe software configuration/structure.

<Modification>

In the present embodiment, the restriction computer 34 outputs the output y (i) as a value without any change to the restriction object value u when the value u is within the allowable range of −LM to LM or (ii) as a restricted value after restricting the value u to the guard value ±LM when the value u is out of boundary (i.e., when the value u is outside of the allowable range of −LM to LM).

However, the calculation in the restriction computer 34 is not necessarily limited to the above. For example, the output y may simply be calculated as a multiplication of the restriction object value u by the intervention coefficient α.

Figure 7:
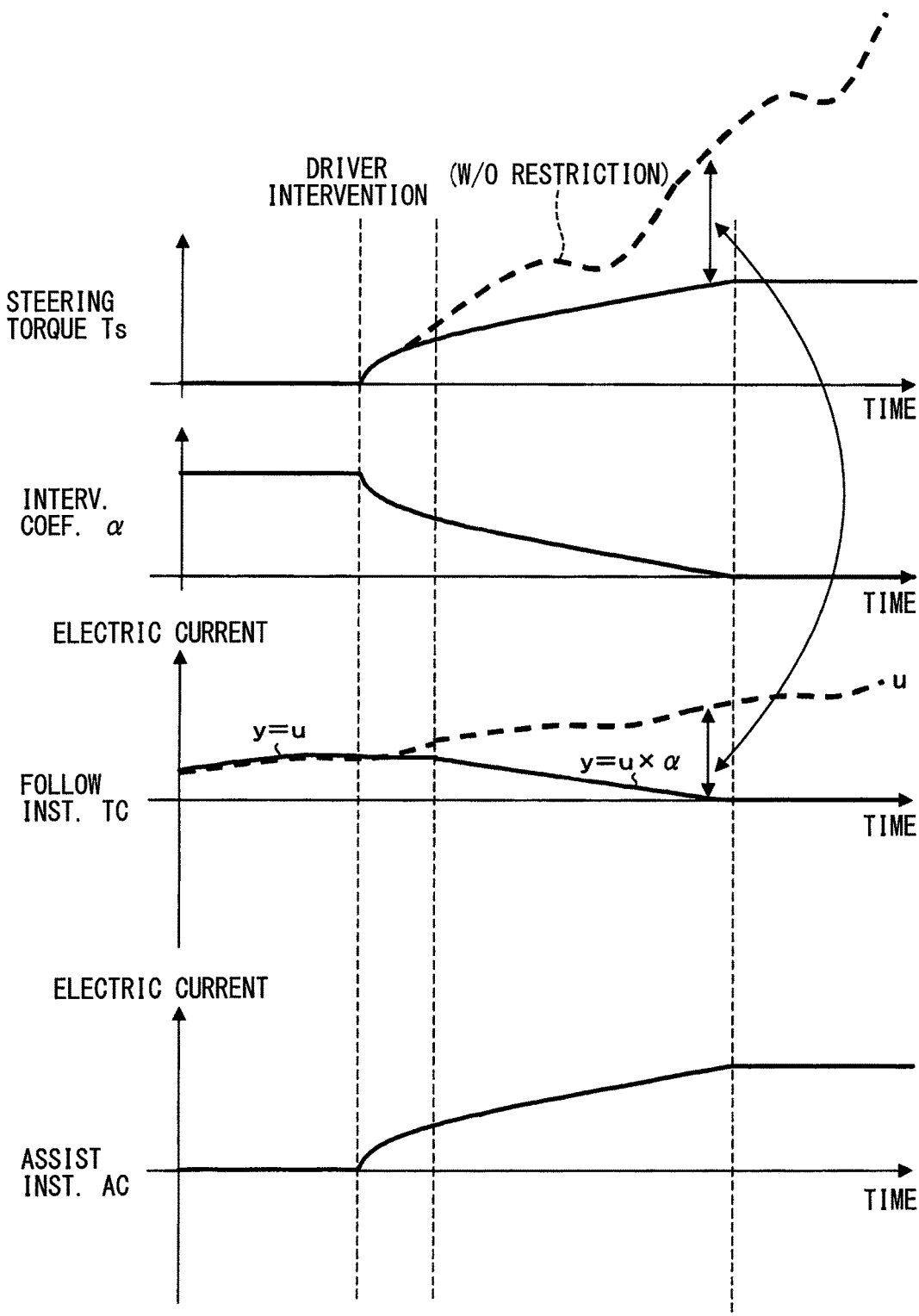
FIG. 7 is a wave form diagram of the restriction computer in a modification of the first embodiment of the present disclosure.

In such case, as shown in FIG. 7, when the intervention operation is detected, and the intervention coefficient is set to a value of less than 1, the restriction of the follow instruction TC immediately starts. In other words, other than such a point, the operation of the modification is basically the same as the first embodiment. Therefore, the same effect as the first embodiment is achieved with a simpler calculation.

In the present embodiment, the target follow control calculator 30 is configured to have the characteristic determiner 32 and the integrator 33, and the characteristic determiner 32 is configured to provide a gain that determines a control characteristic of a PID control. However, the configuration of the calculator 30 may be other than above. For example, the characteristic determiner 32 may be implemented as a phase advance-retardation compensator, or as a controller that is designed to perform an H control.

Second Embodiment

The second embodiment is described in the following.

Since the basic configuration of the second embodiment is the same as the first embodiment, the description of the second embodiment is focused on the difference between the two.

According to the first embodiment, the restriction computer 34 is configured so that the output of the adder constitutes the integrator 33 serves as the restriction object value u and the output y serves as follow instruction TC.

Figure 8:
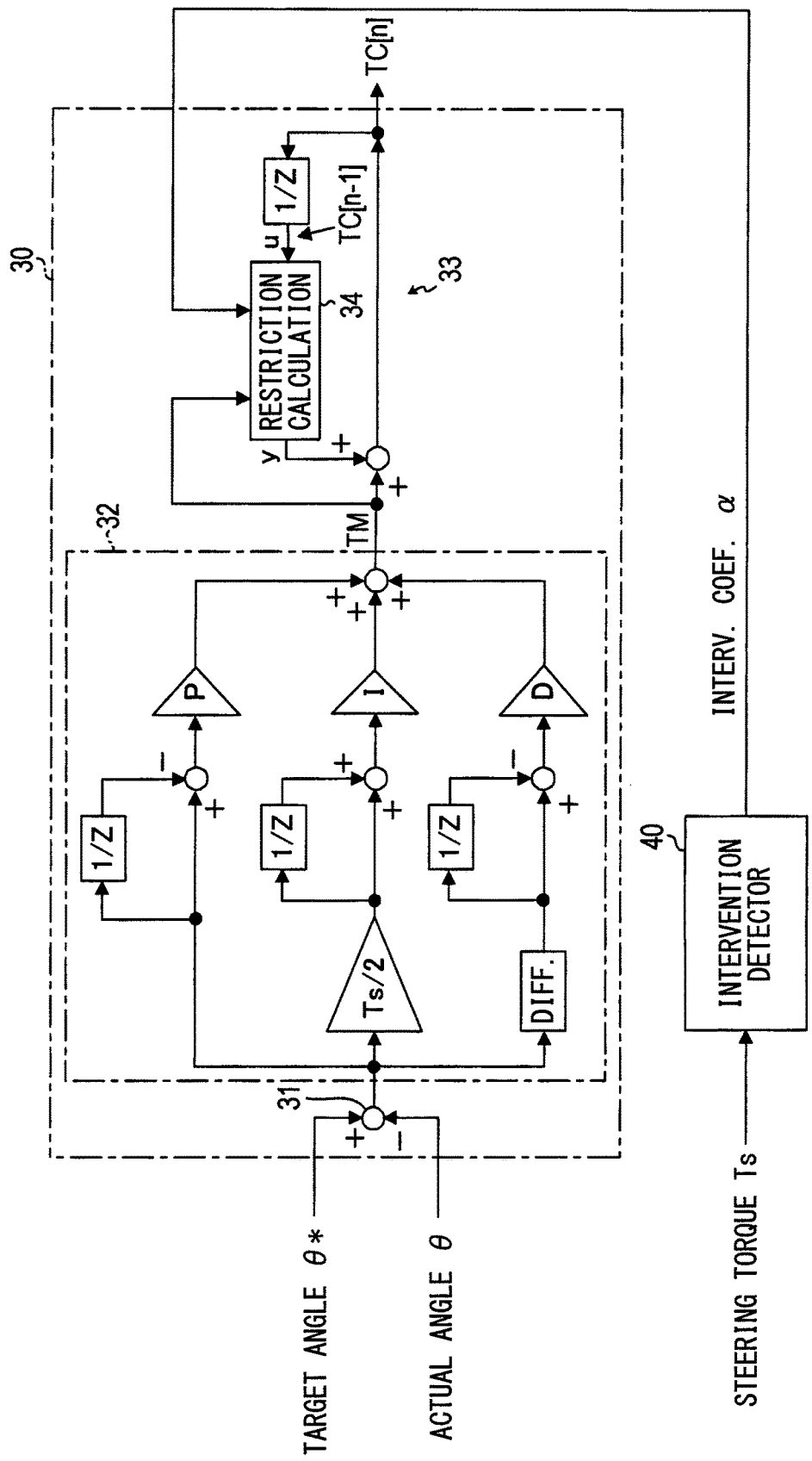
FIG. 8 is a block diagram of the target follow control calculator in the second embodiment of the present disclosure.

On the other hand, in the present embodiment, as shown in FIG. 8, the restriction computer 34 is configured so that the previous value TC[n−1] of the follow instruction serves as the restriction object value u and the output y serves as the additional value added to the integration object value TM by the adder. Further, not only the intervention coefficient α but the integration object value TM is inputted to the restriction computer 34.

Figure 9:
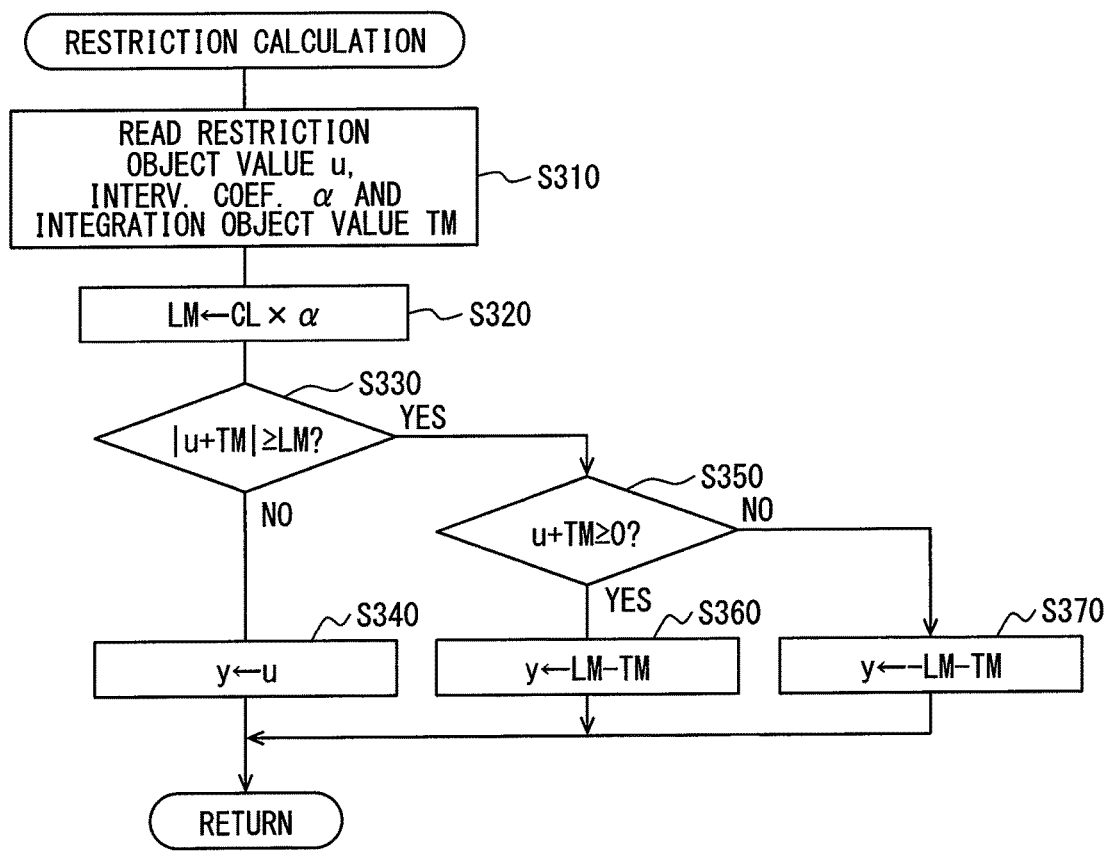
FIG. 9 is a flowchart of a process performed by the restriction computer in the second embodiment of the present disclosure.

The restriction computer 34, as shown in FIG. 9, first, reads the restriction object value u (i.e., the previous value TC[n−1] of the follow instruction), the intervention coefficient α, and the integration object value TM (S310), and the guard value LM is computed by multiplying the upper limit value CL by the intervention coefficient α, just like in the first embodiment (S320).

Then, it is determined whether an absolute value of the addition of the restriction object value u and the integration object value TM (i.e., |u+TM|) is equal to or greater than the guard value LM (S330). That is, it is determined whether the result of addition by the adder that constitutes the integrator 33 exceeds the allowable range of −LM to LM of the follow instruction TC, if the calculation is performed without restriction.

When a value of u+TM is within the allowable range (|u+TM|<LM) (S330—NO), the restriction object value u is set as the output y as it is (i.e., without restriction) (S340).

When a value of u+TM is not within the allowable range (|u+TM|LM) (S330—YES), a value of u+TM is determined as whether it is a non-negative value (S350).

When a value of u+TM is a non-negative value (S350—YES), a result of subtraction, the integration object value TM subtracted from the guard value (i.e., the upper limit value of the allowable range) LM, is set as the output y (S360). Thereby, the result of addition by the adder that constitutes the integrator 33 becomes LM.

When a value of u+TM is a negative value (S350—NO), a result of subtraction (i.e., the integration object value TM subtracted from the negative guard value) (i.e., the lower limit of the allowable range) −LM, is set as the output y (S370). Thereby, the result of addition by the adder that constitutes the integrator 33 becomes −LM.

<Effect>

According to the present embodiment, the same effect as the first embodiment is achieved.

<Modification>

In the present embodiment, the guard value LM is calculated from the intervention coefficient α, and when a result of addition (i.e., adding the restriction object value u to the integration object value TM, is within the allowable range of −LM to LM, the restriction object values u is output as the output y as it is, and when the result of addition is outside of the allowable range of −LM to LM, an after-restriction value restricting the result of addition by the adder of the integrator 33 to the guard value ±LM is output as the output y.

The calculation in the restriction computer 34 is not necessarily limited to the above. For example, the output y may simply be calculated as a multiplication of the restriction object value u by the intervention coefficient α.

Third Embodiment

The third embodiment is described in the following.

Since the basic configuration of the present embodiment is the same as the first embodiment, the description of the present embodiment is focused on the difference between the two.

Figure 10:
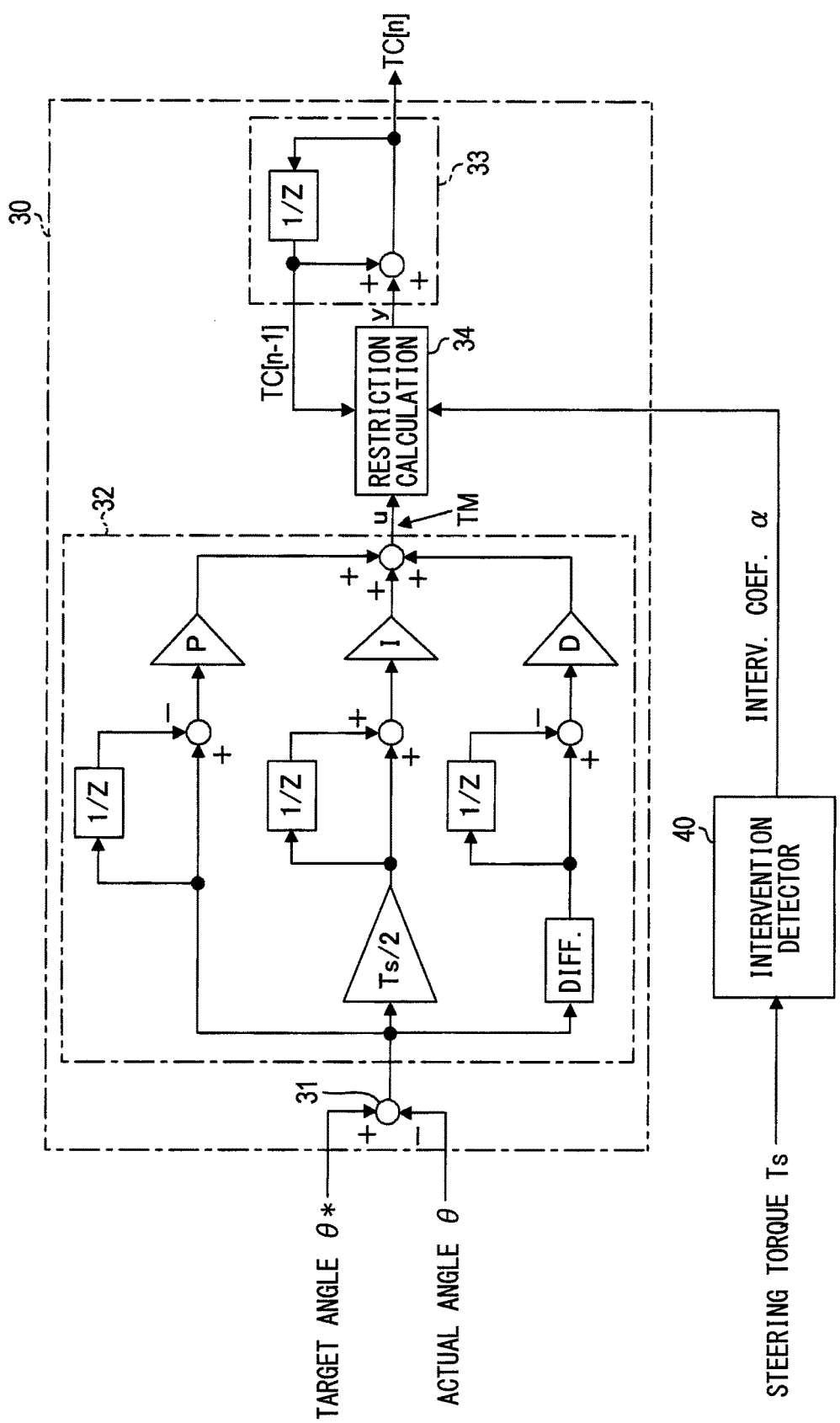
FIG. 10 is a block diagram of the target follow control calculator in the third embodiment of the present disclosure.

Unlike the first embodiment, the configuration of the present embodiment is devised as shown in FIG. 10, in which the restriction computer 34 is configured to receive an output from the characteristic determiner 32 as the restriction object value u, and to provide the output y as the integration object value TM that is supplied to the adder of the integrator 33. Further, not only the intervention coefficient α but also the previous value TC[n−1] of the follow instruction is inputted to the restriction computer 34.

Figure 11:
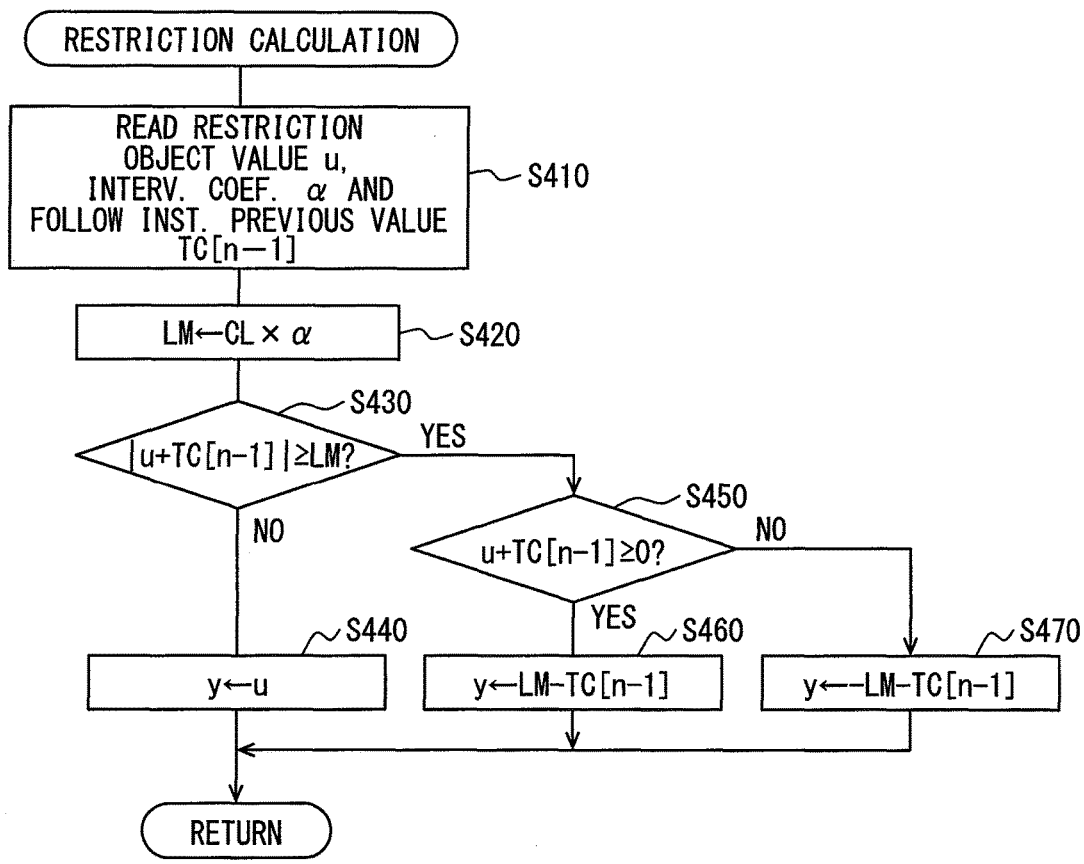
FIG. 11 is a flowchart of a process performed by the restriction computer in the third embodiment of the present disclosure.

The restriction computer 34, as shown in FIG. 11, first reads the restriction object value u (i.e., an output of the characteristic determiner 32), the intervention coefficient α, and the previous value TC[n−1] of the follow instruction (S410), and the guard value LM is computed by multiplying the upper limit value CL by the intervention coefficient α, just like in the first embodiment (S420).

Then, it is determined whether an absolute value of the addition of the restriction object value u, and the previous value TC[n−1] of the follow instruction (i.e., |u+TC[n−1]|), is equal to or greater than the guard value LM (S430). That is, it is determined whether the result of addition by the adder in the integrator 33 exceeds the allowable range of −LM to LM of the follow instruction TC, if the calculation is performed without restriction.

When the value of u+TC[n−1] is within the allowable range (|u+TC[n −1]|<LM) (S430—NO), the restriction object value u is set as the output y as it is (i.e., without restriction) (S440).

When the value of u+TC[n−1] is not within the allowable range (|u+TC[n−1] LM) (S430—YES), it is determined whether the value of u+TC[n−1] is a non-negative value (S450).

When the value u +TC[n−1] is a non-negative value (S450—YES), a result of subtraction, the previous value TC[n−1] of the follow instruction subtracted from the guard value (i.e., the upper limit of the allowable range) LM, is set as the output y (S460). Thereby, the result of addition by the adder in the integrator 33 becomes LM.

When the value of u +TC[n−1] is a negative value (S450—NO), a result of subtraction, (i.e., the previous value TC[n−1] of the follow instruction subtracted from the negative guard value) (i.e., the lower limit of the allowable range) −LM, is set as the output y (S470). Thereby, the result of addition by the adder in the integrator 33 becomes −LM.

<Effect>

According to the present embodiment, the same effect as the first embodiment is achieved.

Further, in the present embodiment, since the restriction is applied in more upstream as compared with the above-mentioned embodiments, even when other applications using the output (i.e., the integration object value TM) exists, an interference with such applications is suppressed. By providing such an interference suppression effect, the versatility of the software architecture (realizing the present embodiment) is improved.

Fourth Embodiment

The fourth embodiment is described in the following.

Since the basic configuration of the present embodiment is the same as the first embodiment, the description of the present embodiment is focused on the difference between the two.

Figure 12:
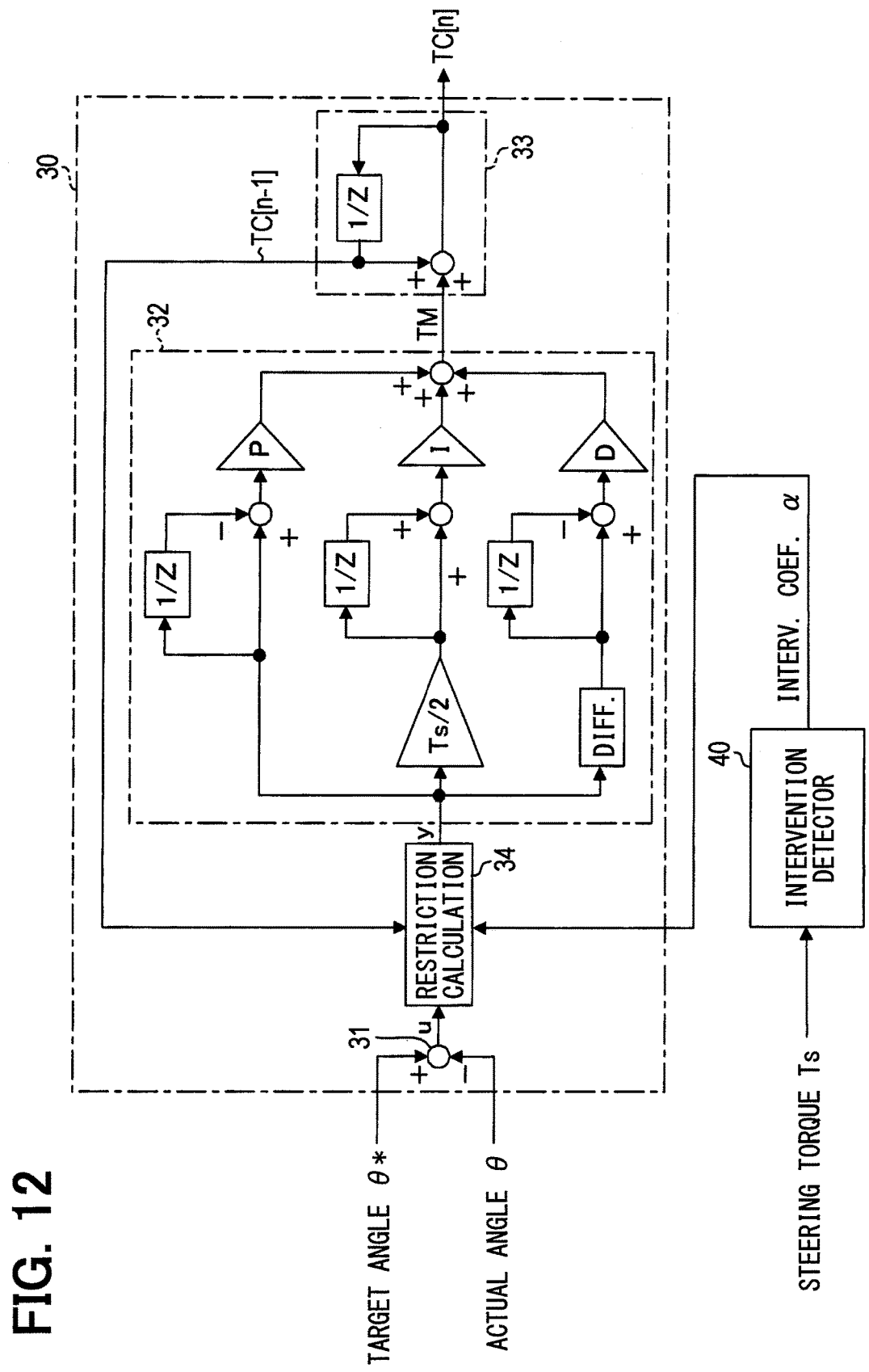
FIG. 12 is a block diagram of the target follow control calculator in the fourth embodiment of the present disclosure.

Unlike the first embodiment, the configuration of the present embodiment is devised as shown in FIG. 12, in which the restriction computer 34 is configured to receive an output from the subtractor 31 as the restriction object value u, and to provide the output y as an input of the characteristic determiner 32. Further, not only the intervention coefficient α but also the previous value TC[n−1] of the follow instruction is inputted to the restriction computer 34.

Figure 13:
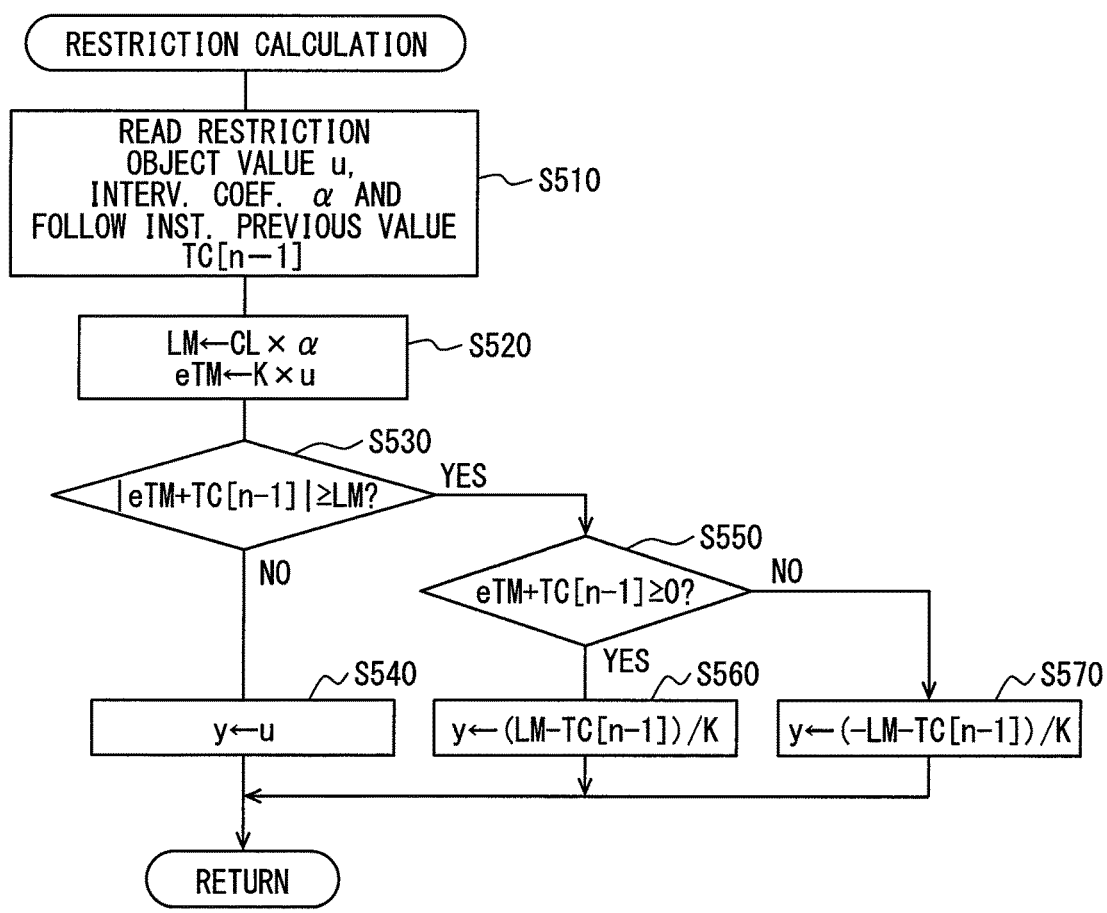
FIG. 13 is a flowchart of a process performed by the restriction computer in the fourth embodiment of the present disclosure.

The restriction computer 34, as shown in FIG. 13, first reads the restriction object value u (i.e., an output of the characteristic determiner 32), the intervention coefficient α and the previous value TC[n−1] of the follow instruction (S510), and calculates an estimation eTM, a value of estimation of the integration object value (i.e., the output of the characteristic determiner 32) by multiplying the restriction object value u by a gain K (i.e., a fixed value, or a constant) of the characteristic determiner 32, and calculating the guard value LM by multiplying the upper limit value CL by the intervention coefficient α (S520). In such case, an actual gain K is not a constant. However, in this embodiment, the gain K is assumed as a constant.

Then, it is determined whether an absolute value of a result of the addition of the estimation eTM and the previous value TC[n−1] of the follow instruction (i.e., |eTM+TC[n−1]|), is equal to or greater than the guard value LM (S530). That is, it is determined whether the result of addition by the adder in the integrator 33 exceeds the allowable range of −LM to LM of the follow instruction TC when the restriction computer 34 does not performs restriction.

When a value of eTM+TC[n−1] is within the allowable range (i.e., |eTM+TC[n−1]|<LM) (S530—NO), the restriction object value u is set as the output y as it is (i.e., without restriction (S540)).

When a value of eTM+TC[n−1] is not within the allowable range (i.e., |eTM+TC[n−1]|≥LM) (S530—YES), it is determined whether the value of eTM +TC[n−1] is a non-negative value (S550).

When the value of eTM+TC[n−1] is a non-negative value (S550—YES), the output y is calculated as a fraction in which a numerator is the result of subtraction of the previous value TC[n−1] of the follow instruction from the guard value (i.e., the upper limit of the allowable range) LM, and a denominator is the gain K (S560). In such manner, the result of addition by the adder of the integrator 33 is substantially the same as LM.

When the value of eTM+TC[n−1] is a negative value (S550—NO), the output y is calculated as a fraction in which a numerator is the result of subtraction of the previous value TC[n−1] of the follow instruction from the negative guard value (i.e., the lower limit of the allowable range) −LM and a denominator is the gain K (S570). In such manner, the result of addition by the adder of the integrator 33 is substantially the same as −LM.

<Effect>

According to the present embodiment, the same effect as the first embodiment is achieved.

Further, in the present embodiment, since the restriction is applied in more upstream as compared with the above-mentioned embodiments, even when other applications using the output (i.e., the deviation of the target angle θ* from the actual angle θ) exists, an interference with such applications is suppressed. By providing such an interference suppression effect, the versatility of the software architecture realizing the present embodiment is improved.

Fifth Embodiment

The fifth embodiment of the present disclosure is described in the following.

Since the basic configuration of the present embodiment is the same as the first embodiment, the description of the present embodiment is focused on the difference between the two.

Figure 14:
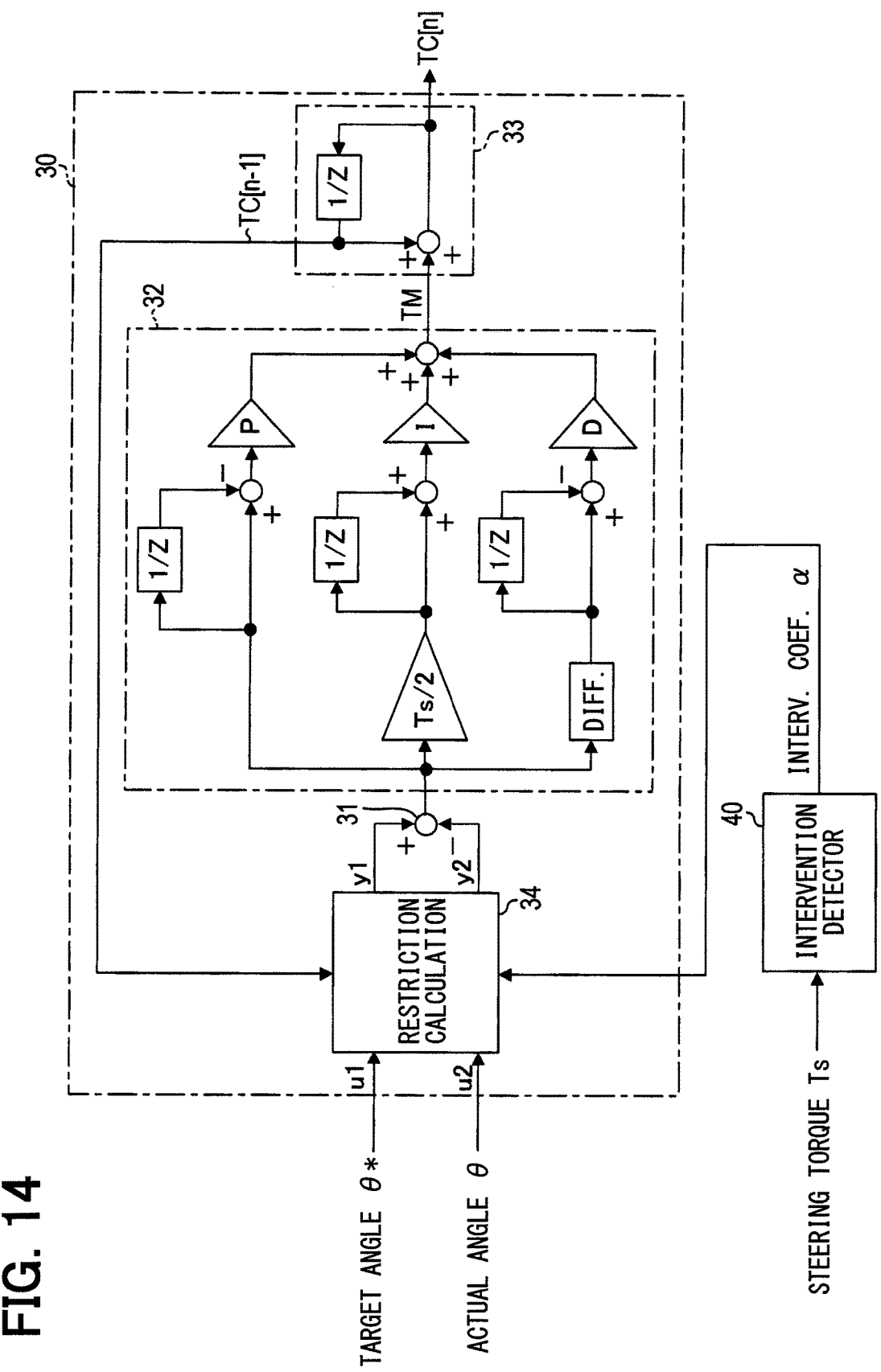
FIG. 14 is a block diagram of the target follow control calculator in the fifth embodiment of the present disclosure.

Unlike the first embodiment, the configuration of the present embodiment is devised as shown in FIG. 14, in which the restriction computer 34 is configured to receive the target angle θ* and the actual angle θ respectively as the restriction object values u1 and u2, and to provide the outputs y1 and y2 as an input of the subtractor 31. Further, not only the intervention coefficient α but also the previous value TC[n−1] of the follow instruction are inputted to the restriction computer 34.

Figure 15:
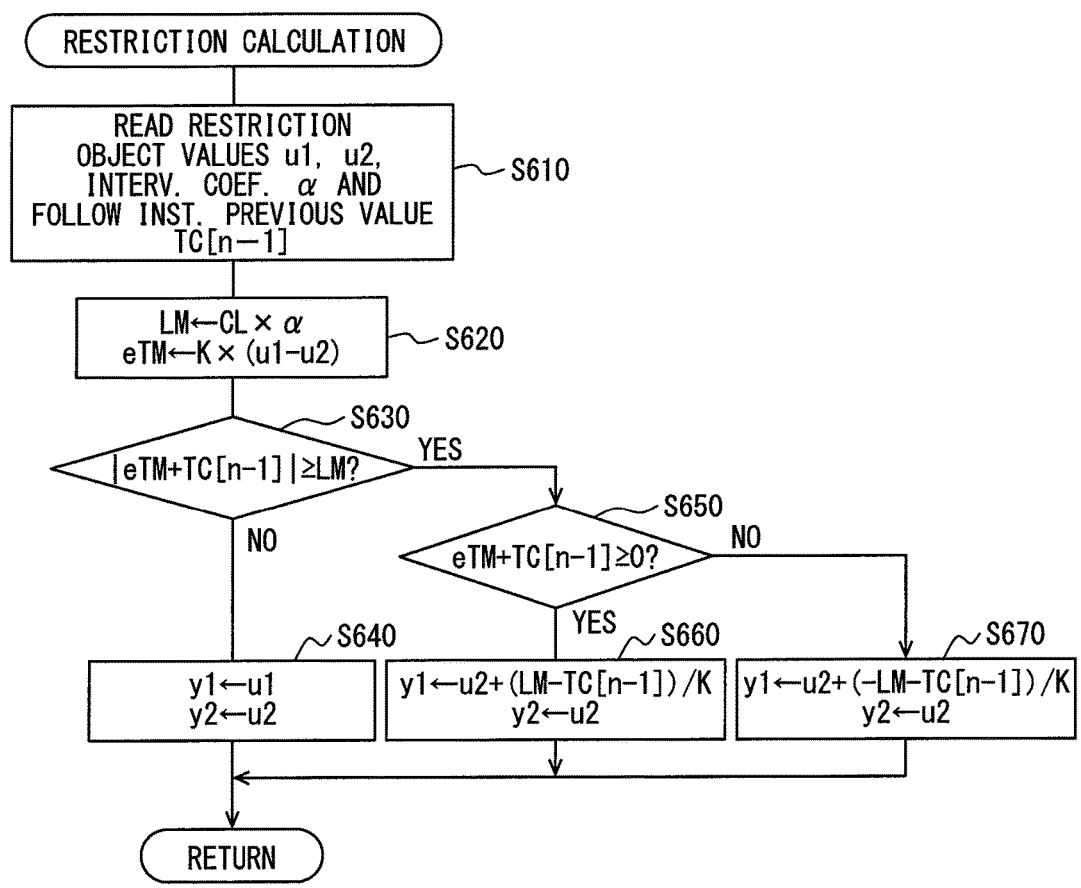
FIG. 15 is a flowchart of a process performed by the restriction computer in the fifth embodiment of the present disclosure.

Further, the restriction computer 34 first reads, as shown in FIG. 15, the restriction object values u1, u2 (i.e., the target angle θ*, the actual angle θ), the intervention coefficient α and the previous value TC[n−1] of the follow instruction (S610), and calculates the estimation eTM, a value of estimation of the integration object value (i.e., the output of the characteristic determiner 32) by multiplying a result of subtraction of the restriction object value u2 from the restriction object value u1 by the gain K of the characteristic determiner 32 (i.e., a fixed value, or a constant) (S620), and calculating the guard value LM by multiplying the upper limit value CL by the intervention coefficient α (S620). In such case, an actual gain K is not a constant. However, in this embodiment, the gain K is assumed to be a constant.

Then, it is determined whether an absolute value of a result of the addition of the estimation eTM and the previous value TC[n−1] of the follow instruction (i.e., |eTM+TC[n−1]|) is equal to or greater than the guard value LM (S630). That is, it is determined whether the result of addition by the adder in the integrator 33 exceeds the allowable range of −LM to LM of the follow instruction TC, when the restriction computer 34 does not perform restriction.

When a value of eTM+TC[n−1] is within the allowable range (i.e., eTM+TC[n−1]|<LM) (S630—NO), the restriction object values u1, u2 are output as the output y1 and y2 as it is, without restriction (S640).

When a value of eTM+TC[n−1] is not within the allowable range (i.e., |eTM+TC[n−1]|LM) (S630—YES), it is determined whether the value of eTM +TC[n−1] is a non-negative value (S650).

When the value of eTM+TC[n−1] is a non-negative value (S650—YES), the output y1 is calculated as a value of addition of the restriction object value u2 to a fraction in which a numerator is the result of subtraction of the previous value TC[n−1] of the follow instruction from the guard value (i.e., the upper limit of the allowable range) LM and a denominator is the gain K, and the output y2 is set as an as-is value of the restriction object value u2 (S660). In such manner, the result of addition by the adder of the integrator 33 is substantially the same as LM.

When the value of eTM+TC[n−1] is a negative value (S650—NO), the output y1 is calculated as a value of addition of the restriction object value u2 to a fraction in which a numerator is the result of subtraction of the previous value TC[n−1] of the follow instruction from the negative guard value (i.e., the lower limit of the allowable range) −LM and a denominator is the gain K, and the output y2 is set as an as-is value of the restriction object value u2 (S660). In such manner, the result of addition by the adder of the integrator 33 is substantially the same as −LM.

<Effect>

According to the present embodiment, the same effect as the fourth embodiment is achieved.

According to the present embodiment, in S660 and S670, the restriction object value u1 is restricted. However, the restriction object value u2 may also be restricted. In such case, in S660, y1←u1, y2←u1−(−LM−TC−[n−1])/K, and in S670, y1←u1, y2←u1−(−LM−TC−[n−1])/K Sixth Embodiment The sixth embodiment of the present disclosure is described in the following.

Since the basic configuration of the present embodiment is the same as the first embodiment, the description of the present embodiment is focused on the difference between the two.

Figure 16:
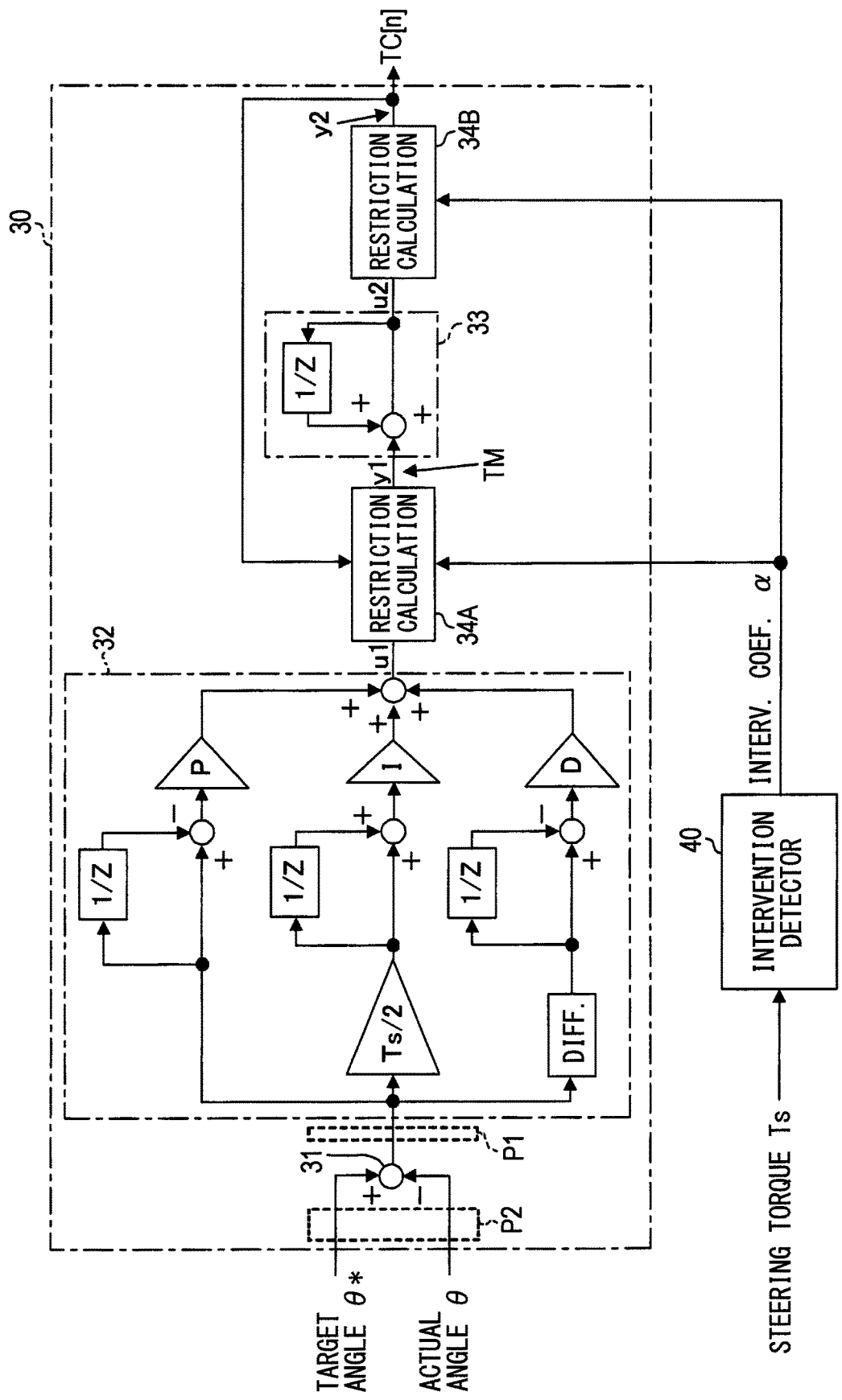
FIG. 16 is a block diagram of the target follow control calculator in the sixth embodiment of the present disclosure.

Unlike the first embodiment, the configuration of the present embodiment is devised as shown in FIG. 16, in which two restriction computers 34A and 34B are provided before and after the integrator 33.

The restriction computer (i.e., "a pre-process restriction computer" hereafter) 34A is configured to receive an output of the characteristic determiner 32 as the restriction object value u1, and to provide the output y1 as an input of the integrator 33 (i.e., the integration object value TM), and the intervention coefficient α and the follow instruction TC[n] are inputted to the restriction computer 34A.

The restriction computer (i.e., "a post-process restriction computer" hereafter) 34B is configured to receive an output of the integrator 33 as the restriction object value u2, and to provide the output y2 as the follow instruction TC[n], and the intervention coefficient α is inputted to the restriction computer 34B.

Figure 17:
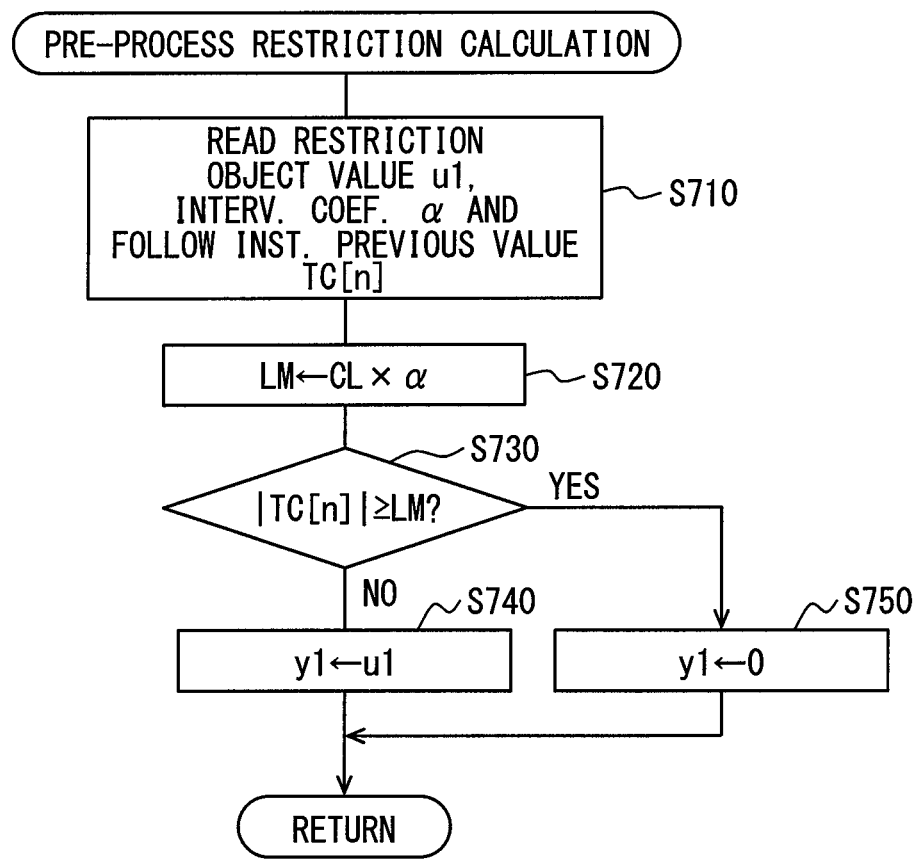
FIG. 17 is a flowchart of a process performed by the restriction computer (i.e., a pre-process restriction computer) in the sixth embodiment of the present disclosure.

Further, the pre-process restriction computer 34A, as shown in FIG. 17, firstly reads the restriction object value u1 (i.e., an output of the characteristic determiner 32), the intervention coefficient α, and the follow instruction TC[n] (S710), and the guard value LM is calculated by multiplying the upper limit value CL by the intervention coefficient α (S720).

Then, it is determined whether an absolute value of the follow instruction |TC[n]| is equal to or greater than the guard value LM (S730). That is, it is determined whether the follow instruction TC[n] exceeds the allowable range of −LM to LM.

When a value of TC[n] is within the allowable range (i.e., |TC[n]|<LM) (S730—NO), the restriction object value u1 is set as the output y1 as it is (i.e., without restriction (S740)).

When the value of TC[n] is not within the allowable range (i.e., (TC[n]|≥LM) (S730—YES), the output y1 is set to zero (S750).

That is, when the follow instruction TC is outside the allowable range, the accumulation of the internal value of the integrator 33 is kept from being performed by setting the restriction object value u1 (i.e., the integration object value TM) to zero.

Figure 18:
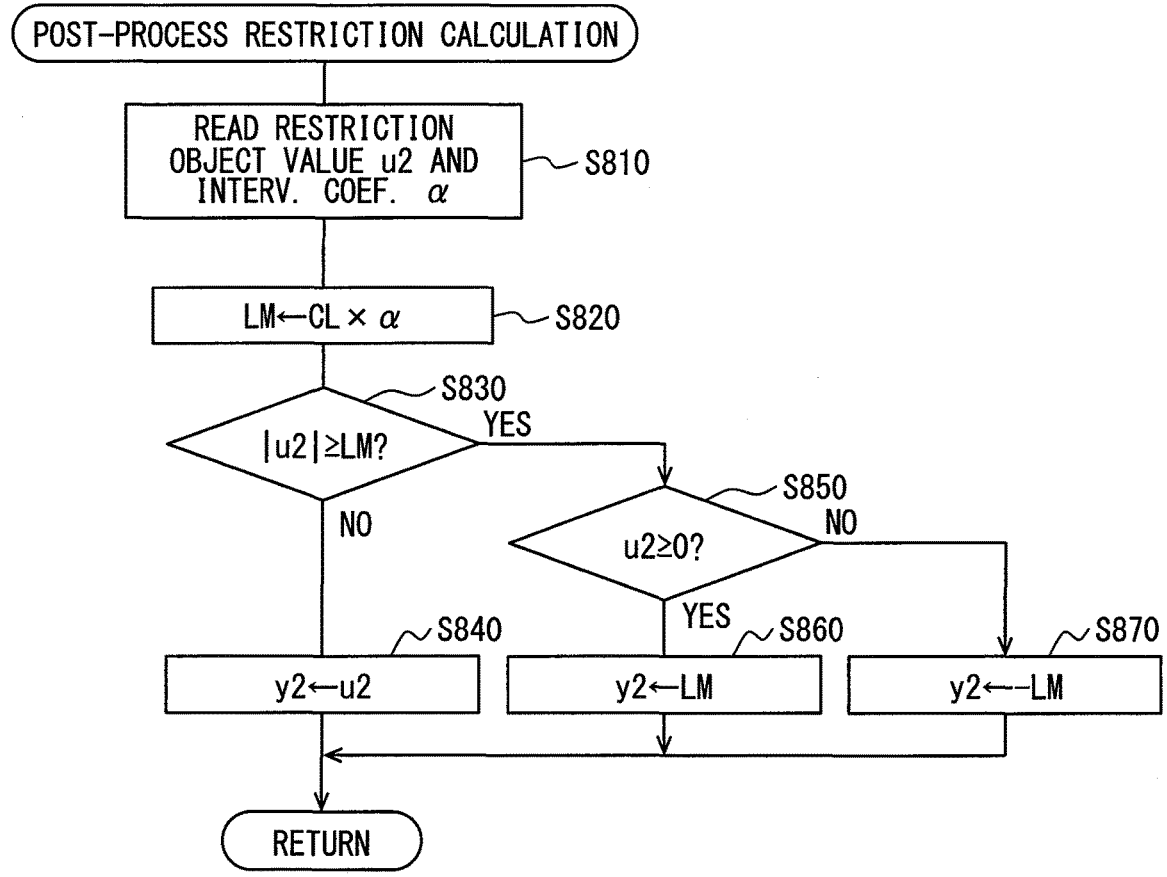
FIG. 18 is a flowchart of a process performed by the restriction computer (i.e., a pre-process restriction computer) in the sixth embodiment of the present disclosure.

On the other hand, post-process the restriction computer 34B, as shown in FIG. 18, first reads the restriction object value u2 (i.e., an output of the integrator 33) and the intervention coefficient α (S810), and the guard value LM is calculated by multiplying the upper limit value CL by the intervention coefficient α (S820).

Then, it is determined whether an absolute value of the restriction object value |u2| is equal to or greater than the guard value LM (S830). That is, it is determined whether the result of integration in the integrator 33 exceeds the allowable range of −LM to LM.

When a value of u2 is within the allowable range (i.e., |u2|<LM) (S830—NO), the restriction object value u2 is set as the output y2 as it is, without restriction (S840).

When the value of u2 is not within the allowable range (i.e., |u2|<LM) (S830—YES), it is determined whether the value u2 is a non-negative value (S850).

When the value of u2 is a non-negative value (S850—YES), the guard value (i.e., the upper limit of the allowable range) LM is set as the output y2 (S860).

When the value of u2 is a negative value (S850—NO), the negative guard value (i.e., the lower limit of the allowable range) −LM is set as the output y2 (S870).

<Effect>

According to the present embodiment, the same effect as the first embodiment is achieved.

According to the present embodiment, since the restriction computers 34A and 34B perform restriction at different positions, restriction is more securely performed to an abnormal value, which may be caused by the internal value being turned to a garbage data or the like.

Although the pre-process restriction computer 34A in the present embodiment is provided at a position that restricts the output of the characteristic determiner 32 (i.e., an input of the integrator 33), such a position may be changed to a point P1 or to a point P2 in FIG. 16.

More practically, when the pre-process restriction computer 34A is located at the point P1, the output of the subtractor 31 serves as the restriction object value u1, and the output y1 is provided as an input of the characteristic determiner 32. In such case, the contents of the process in the pre-process restriction computer 34A are the same as that in FIG. 17 (i.e., the process of the restriction computer 34A at the point P1 is kept unchanged from the one described above).

On the other hand, when the pre-process restriction computer 34A is located at point P2, the target angle θ* and the actual angle θ are set as restriction object values u11 and u12, and outputs y11 and y12 become an input of the subtractor 31. In such case, the contents of the process in the pre-process restriction computer 34A may be changed as follows (i.e., in S740, y11←u11 and y12←u12, and, in S750, y11=y12).

Seventh Embodiment

The seventh embodiment of the present disclosure is described in the following.

Since the basic configuration of the present embodiment is the same as the first embodiment, the description of the present embodiment is focused on the difference between the two.

In the first embodiment, a control structure of the target follow control calculator 30 is configured so that, after providing a PID gain for the deviation between the target angle θ* and the actual angle θ in the characteristic determiner 32, integration is performed by the integrator 33.

Figure 19:
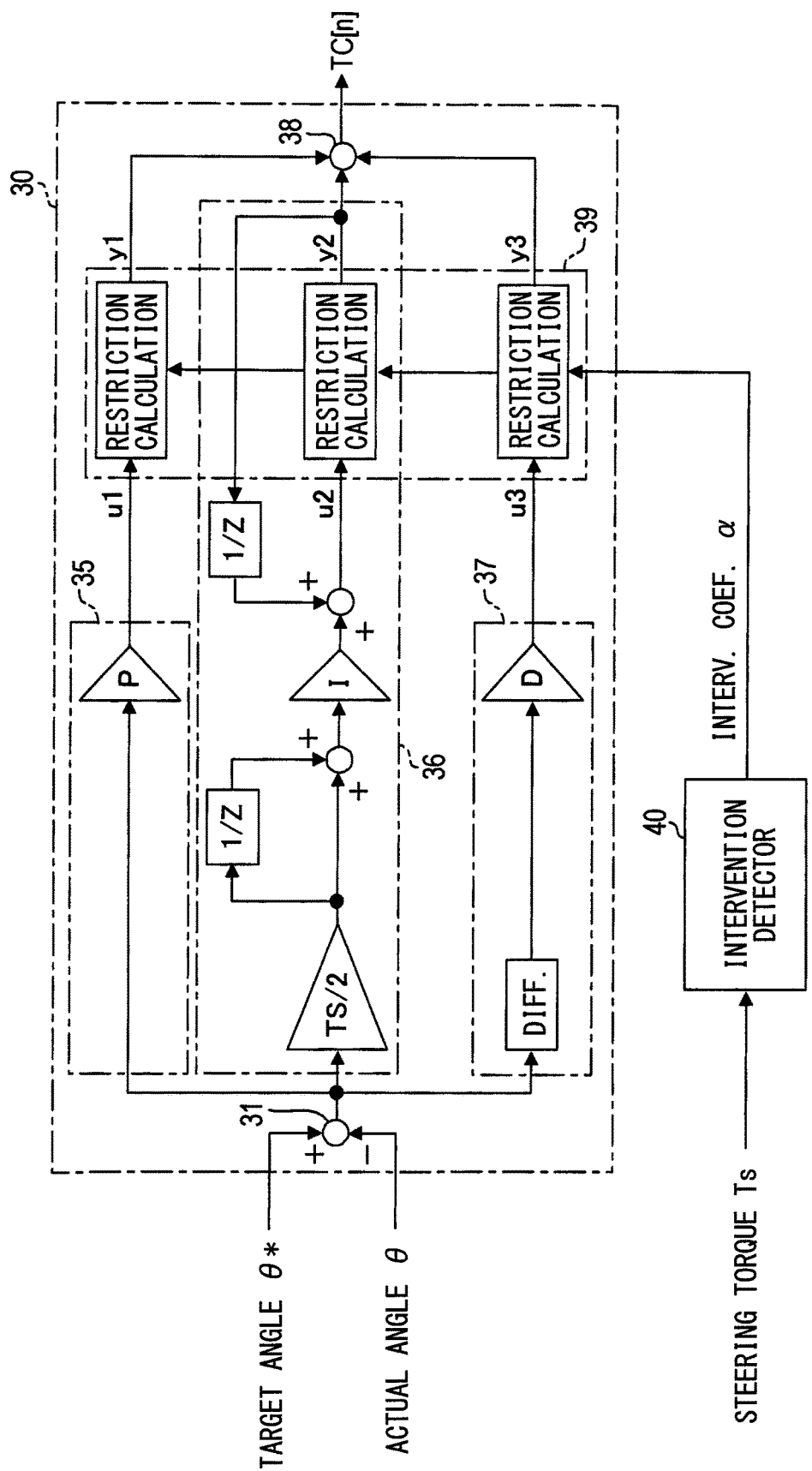
FIG. 19 is a block diagram of the target follow control calculator in the seventh embodiment of the present disclosure.

On the other hand, the target follow control calculator 30a in the present embodiment has, as shown in FIG. 19, the subtractor 31 that calculates a deviation of the actual angle θ from the target angle θ*, a proportional component computer 35 that calculates a proportional component of the follow instruction TC based on the deviation calculated by the subtractor 31, an integral component computer 36 that calculates an integral component of the follow instruction TC based on the deviation calculated by the subtractor 31, a differential component computer 37 that calculates a differential component of the follow instruction TC based on the deviation calculated by the subtractor 31, an adder 38 that adds the calculated result from each of the computers 35-37 and calculates the follow instruction TC, and a restriction computer 39 that restricts the follow instruction TC by restricting an internal value used for the calculation in the target follow control calculator 30a according to the intervention coefficient α.

Although each of the computers 35-37 is well-known, the integral component computer 36 may specifically be mentioned as follows. That is, the integral component computer 36 performs a bilinear transformation for the discrimination of the general integration control equation, and for realizing a control structure based on the equation derived from such transformation, which are well-known in the art.

The restriction computer 39 is put in a control structure so as (i) to receive an output of the proportional component computer 35 as a restriction object value u1, (ii) to receive an output of the differential component computer 37 as a restriction object value u3, and (iii) to receive, in the integral component computer 36, an output of the adder as a restriction object value u2. The restriction computer also yields outputs y1, y2, y3 respectively from the proportional component computer 35, differential component computer 37, and integral component computer 36. Outputs y1, y2 and y3 are to be supplied to the adder 38 as three pieces of input.

Figure 20:
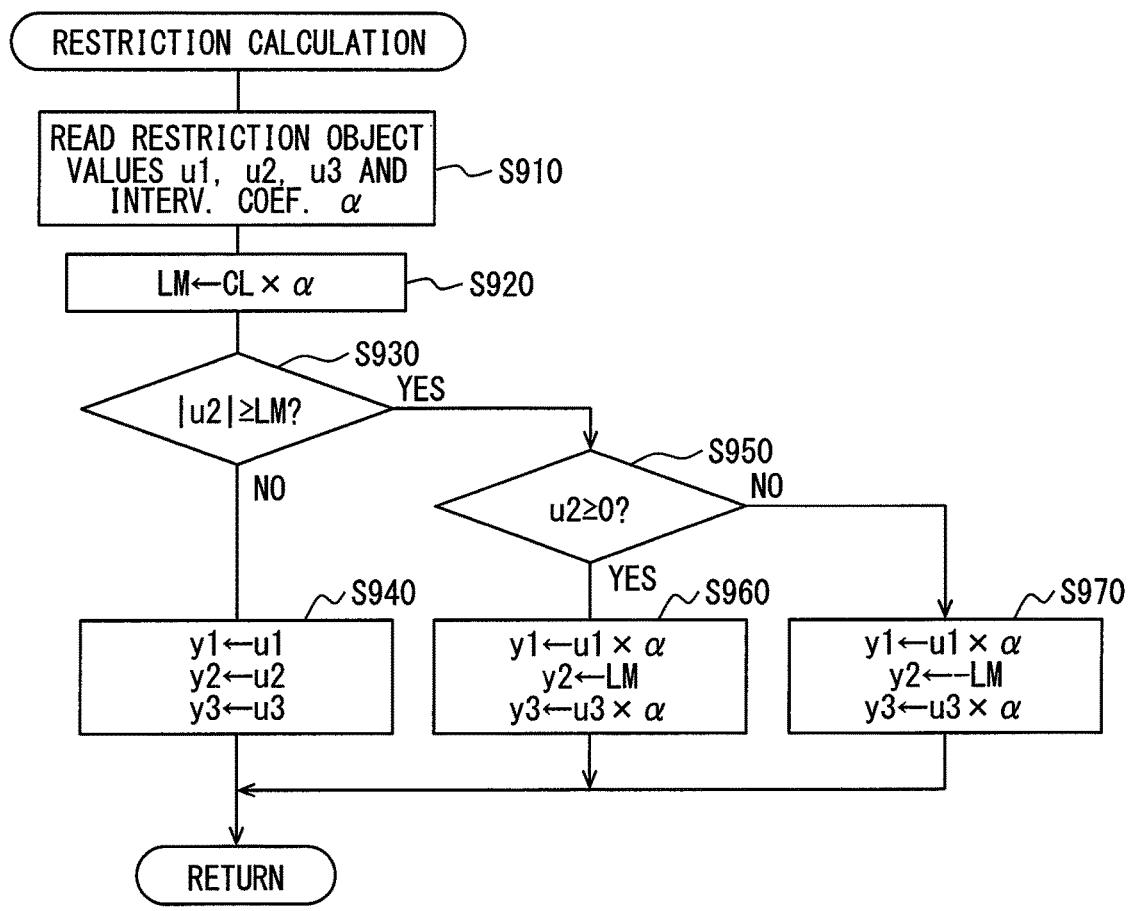
FIG. 20 is a flowchart of a process performed by the restriction computer in the seventh embodiment of the present disclosure.

Then, the restriction computer 39, as shown in FIG. 20, firstly reads the restriction object values u1-u3 and the intervention coefficient α (S910), and the guard value LM is calculated by multiplying the upper limit value CL by the intervention coefficient α (S920).

Then, it is determined whether an absolute value of the restriction object value u2 (i.e., an internal value of the integration calculation) |u2| is equal to or greater than the guard value LM (S930).

When |u|<LM (S930—NO), the restriction object values u1-u3 are set up as the outputs y1-y3 as it is, without restriction (S940).

When |u|LM (S930—YES), it is determined whether the restriction object value u2 is a non-negative value (S950).

When the restriction object value u2 is a non-negative value (S950—YES), the outputs y1 and y3 are calculated by multiplying the restriction object values u1 and u3 by the intervention coefficient α, and the guard value (i.e., the upper limit of the allowable range) LM is set as the output y3 (S960).

When the restriction object value u2 is a negative value (S950—NO), the outputs y1 and y3 are calculated by multiplying the restriction object values u1 and u3 by the intervention coefficient α, and the negative guard value (i.e., the lower limit of the allowable range) −LM is set as the output y3 (S970).

<Effect>

According to the present embodiment, the same effect as the first embodiment is achieved.

In the present embodiment, since restriction is applied to each of the proportional component, the integrated component, and the differential component of the follow instruction TC, when other applications using these outputs (i.e., the proportional component, the integrated component, or the differential component) exist, the interference with such application is suppressed. By providing such an interference suppression effect, the versatility of the software architecture (realizing the present embodiment) is improved.

Eighth Embodiment

The eighth embodiment of the present disclosure is described in the following.

Since the basic configuration of the present embodiment is the same as the first embodiment, the description of the present embodiment is focused on the difference between the two.

In the first embodiment, the target follow control calculator 30 is configured to restrict the follow instruction TC based on the intervention coefficient α representing the detection result of the intervention detector 40.

Figure 21:
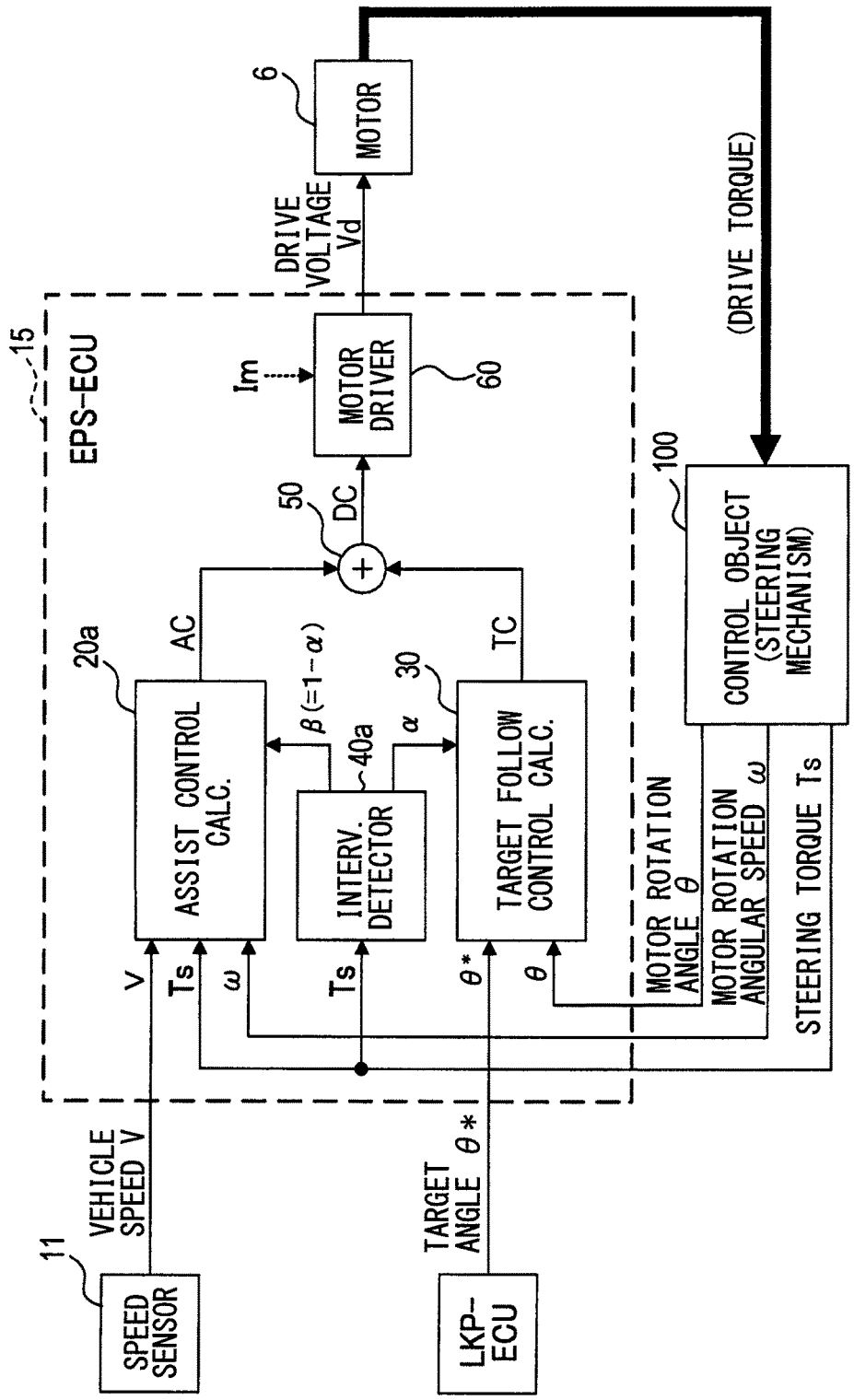
FIG. 21 is a block diagram of a configuration of EPS-ECU in the eighth embodiment of the present disclosure.

On the other hand, two intervention coefficients α and β, which represent the detection result of the intervention detector 40a, are generated in the present embodiment as shown in FIG. 21, and while restricting the internal value of the target follow control calculator 30 according to the intervention coefficient α for the restriction of the follow instruction TC, restriction of the internal value of the assist control calculator 20a is performed according to the intervention coefficient β at the same time, thereby restricting the assist instruction AC.

The target follow control calculator 30 may have a configuration of any one of the same calculator 30 in the first to eighth embodiments.

<Intervention detector>

Figure 22:
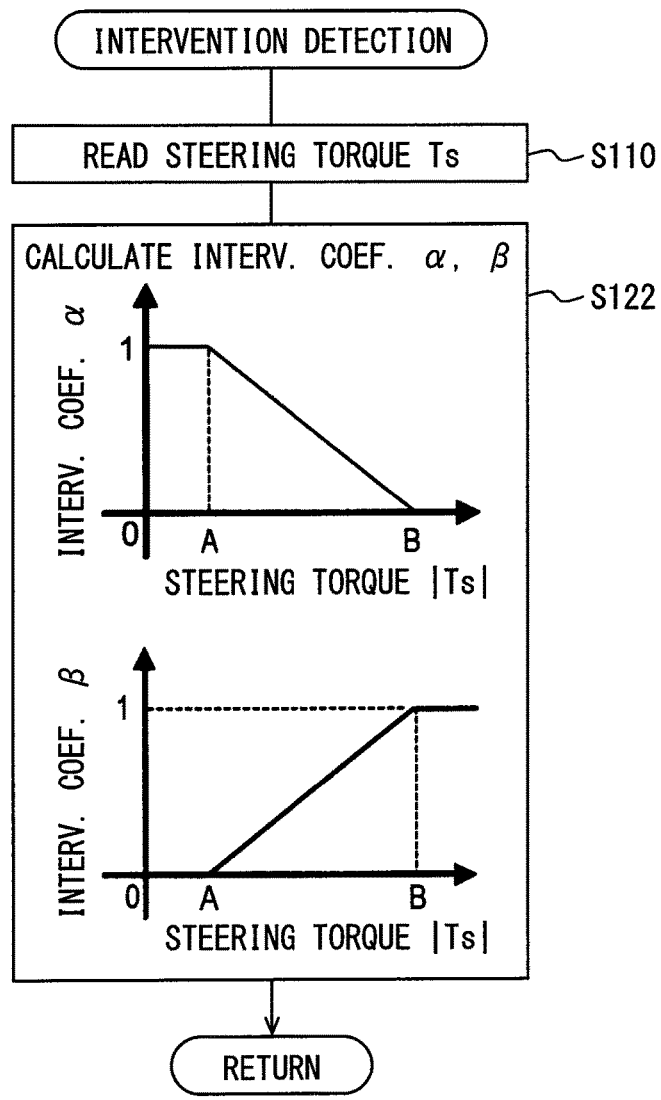
FIG. 22 is a graph of conversion characteristics by the intervention detector for converting a steering toque to an intervention coefficient in the eighth embodiment of the present disclosure.

The intervention detector 40a first reads, as shown in FIG. 22, the steering torque Ts (S110), and calculates the intervention coefficients α and β according to an absolute value |Ts| of the steering torque Ts read in the above with the help of the preset conversion table (S122).

Then, the intervention detector 40a supplies the intervention coefficient α to the target follow control calculator 30, and supplies the intervention coefficient β to the assist control calculator 20a.

Here, since the conversion table used for the calculation of the intervention coefficient α is the same as the one described with the intervention detector 40, description of the table is omitted. On the other hand, the conversion table used for the calculation of the intervention coefficient β outputs β=0 when |Ts|≤ A, and outputs β=1 when |Ts|≥B, and outputs a monotonously increasing value in a β=0 to β=1 range according to an increase of |Ts| when A<|Ts|<B.

That is, the intervention detector 40a generates the intervention coefficient β, which is characterized to increase (i.e., to take a greater value) as the absolute value of the steering torque |Ts| increases (i.e., as a degree of intervention in the steering operation is greater). The values A and B are already described as the description of the intervention detector 40.

That is, the intervention coefficients α and β have a relationship of β=(1−α) (i.e., the intervention coefficient β and the intervention coefficient α take "complementary values" with each other). The relationship between the intervention coefficients α and β are not necessarily limited to the above, and may be defined arbitrarily as long as fulfilling that α+β≤1.

<Assist Control Calculator>

Figure 23:
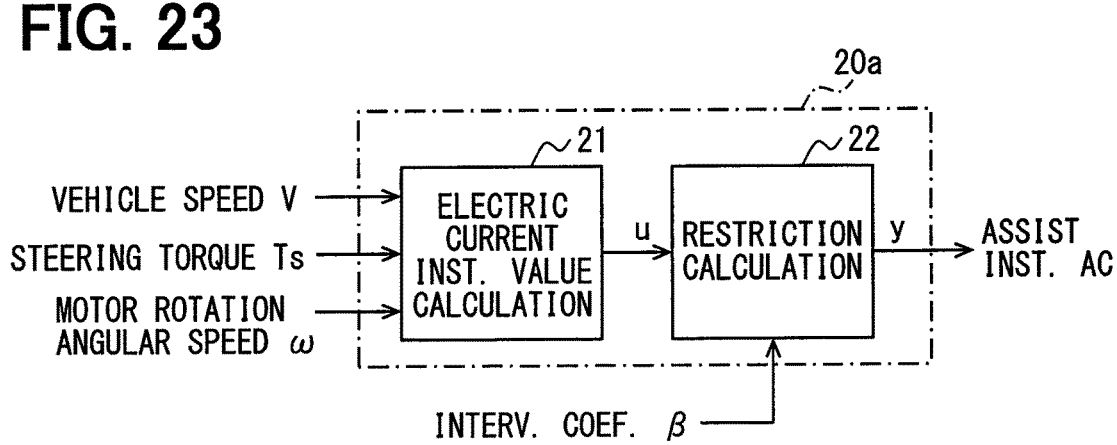
FIG. 23 is a block diagram of the target follow control calculator in the eighth embodiment of the present disclosure.

The assist control calculator 20a includes, as shown in FIG. 23, an electric current instruction value calculator 21, which has the same function as the assist control calculator 20 of the first embodiment, and a restriction calculator 22, which restricts the assist instruction AC by restricting the internal value of the calculation in the assist control calculator 20a.

The restriction calculator 22 is configured to receive an output of the electric current instruction value calculator 21 as the restriction object value u, and to provide an output y that serves as the assist instruction AC.

Figure 24:
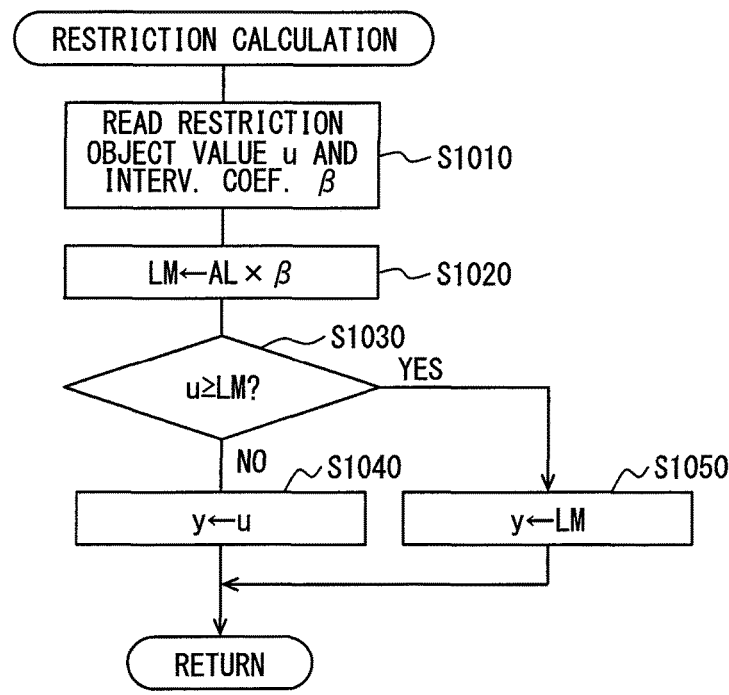
FIG. 24 is a flowchart of a process performed by the restriction computer in the eighth embodiment of the present disclosure.

Further, the restriction calculator 22, as shown in FIG. 24, first reads the restriction object value u (i.e., an output of the electric current instruction value calculator 21) and the intervention coefficient β (S1010), and the guard value LM is calculated by multiplying an upper limit value AL of the assist instruction that is set up in advance by the intervention coefficient β (S1020). The upper limit value AL is set as the rated electric current of the motor, for example.

Then, it is determined whether the restriction object value u is equal to or greater than the guard value LM (S1030). That is, it is determined whether the result of calculation in the electric current instruction value calculator 21 exceeds the allowable range of 0 to LM.

When the restriction object value u<LM (S1030—NO), the restriction object value u is set as the output y as it is (i.e., without restriction (S1040)).

When the restriction object value u LM (S1030—YES), the guard value LM is set as the output y (S1050).

<Effect>

In the present embodiment, when the intervention operation by the driver is detected, the follow instruction TC is decreased according to a degree of intervention (i.e., the magnitude of the steering torque Ts), and the assist instruction AC is increased.

According to the present embodiment, the restriction of the assist instruction AC and the restriction of the follow instruction TC are performed in a mutually-dependent manner (i.e., are associated with each other). Therefore, when the driver performs the intervention operation, a transition from the target follow control to the assist control is enabled, without leaving a wrong feeling for the driver (i.e., the driver override is smoothly enabled). In addition, since the range of a drive instruction DC, which is an addition of the assist instruction AC and the follow instruction TC is also restricted, the capacity of the motor 6 is maximized.

Further, in the present embodiment, since both of the assist instruction AC and the follow instruction TC are restricted, giving priority to the target follow control over the assist control may, for example, be realizable. Such an arbitration of two controls may be beneficial, for example, for a situation in which the steering operation has to be performed without regard to the driver's intention for the avoidance of an accident.

<Modification>

The configuration of the assist control calculator 20a is not limited to the one mentioned above.

Figure 25:
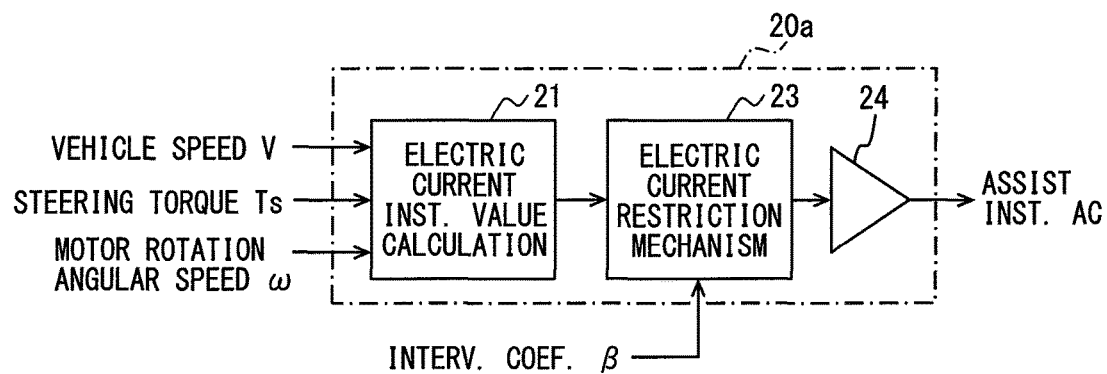
FIG. 25 is a block diagram of an assist controller in a modification of the eighth embodiment of the present disclosure.

For example, an electric current restriction mechanism 23 that restricts an output of the electric current instruction value calculator 21 by a fixed guard value may be used together with a multiplier 24 that outputs the assist instruction AC by multiplying an output of the electric current restriction mechanism 23 by the intervention coefficient β, in place of the restriction calculator 22 mentioned above, as shown in FIG. 25.

Ninth Embodiment

The ninth embodiment of the present disclosure is described in the following.

Since the basic configuration of the present embodiment is the same as the first embodiment, the description of the present embodiment is focused on the difference between the two.

According to the eighth embodiment, the assist control calculator 20a restricts the assist instruction AC according to the intervention coefficient β, which is generated by the intervention detector 40a.

Figure 26:
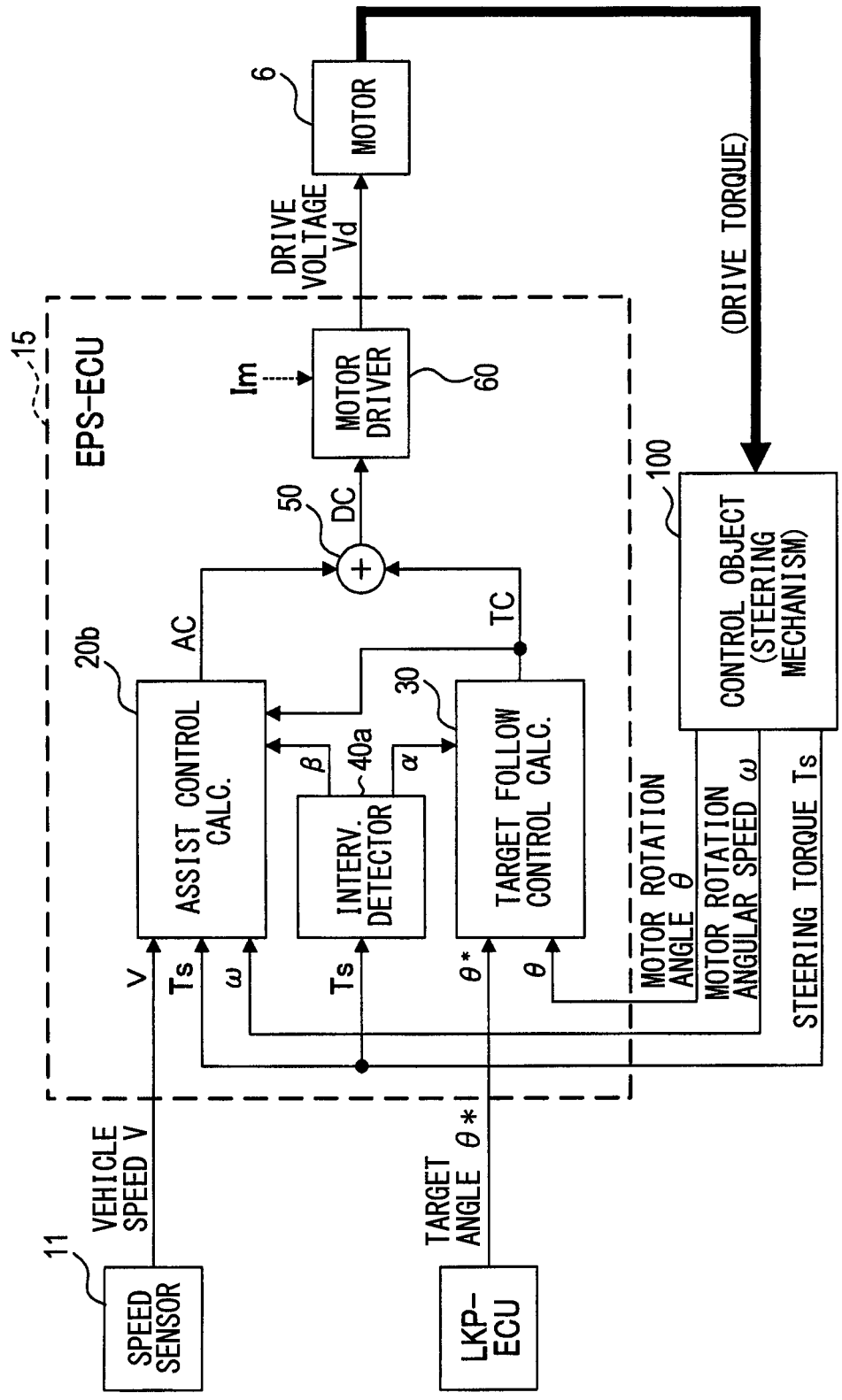
FIG. 26 is a block diagram of a configuration of EPS-ECU in the ninth embodiment of the present disclosure.

On the other hand, in the present embodiment, as shown in FIG. 26, the assist control calculator 20b restricts the assist instruction AC according to the follow instruction TC, which is generated by the target follow control calculator 30 in addition to the intervention coefficient β, which is generated by the intervention detector 40a.

<Assist Control Calculator>

Figure 27:
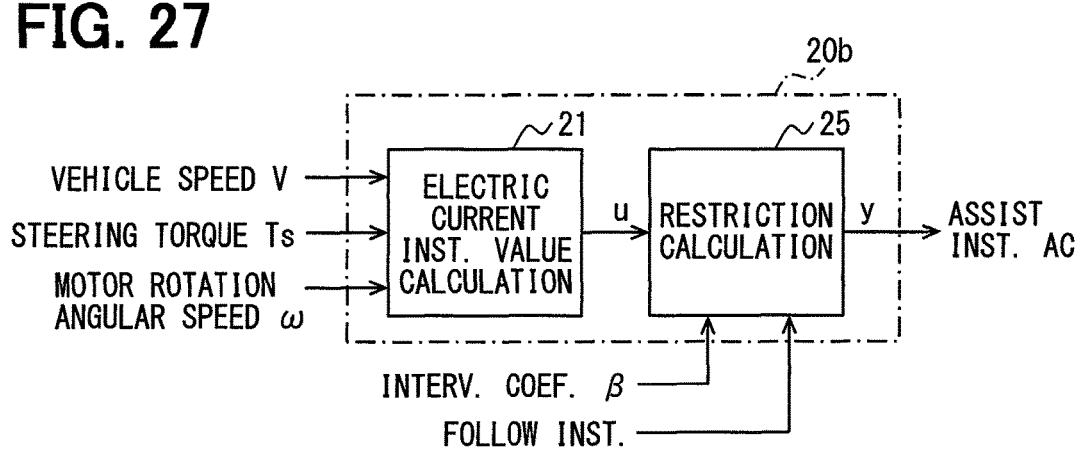
FIG. 27 is a block diagram of the assist controller in the ninth embodiment of the present disclosure.

The assist control calculator 20b has, as shown in FIG. 27, the electric current instruction value calculator 21 and a restriction calculator 25, which restricts the assist instruction AC by restricting the internal value of the calculation in the assist control calculator 20b, according to the intervention coefficient β and the follow instruction TC.

The restriction calculator 25 is configured to receive an output of the electric current instruction value calculator 21 as the restriction object value u, and to provide the output y as the assist instruction AC.

Figure 28:
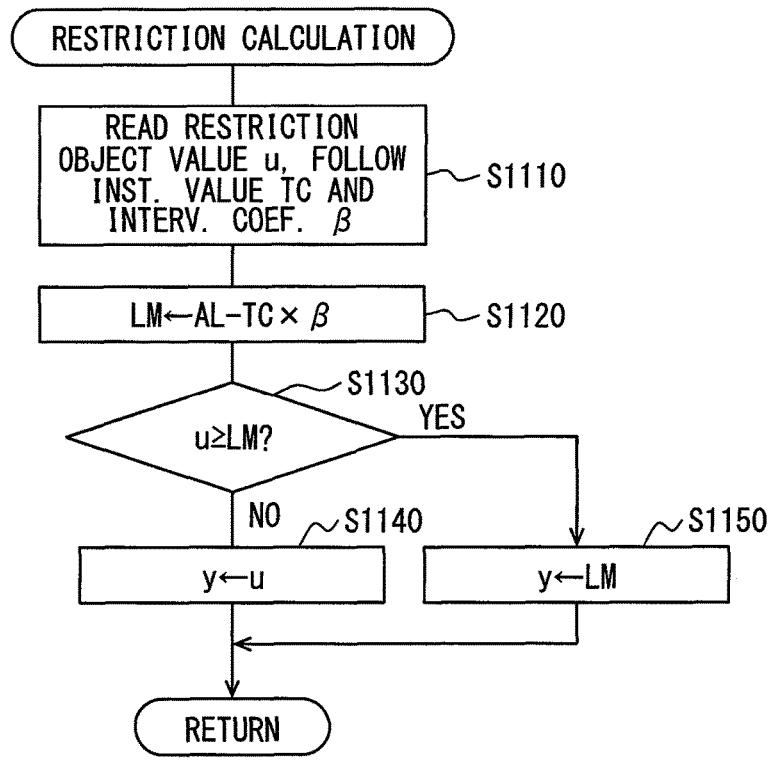
FIG. 28 is a flowchart of a process performed by the restriction computer in the ninth embodiment of the present disclosure.

Further, the restriction calculator 25, as shown in FIG. 28, first reads the restriction object value u (i.e., an output of the electric current instruction value calculator 21), the intervention coefficient β and the follow instruction TC (S1110), and the guard value LM is calculated by subtracting, from the upper limit value LM, a result of multiplication of the follow instruction TC and the intervention coefficient β (S1120).

Then, it is determined whether the restriction object value u is equal to or greater than guard value LM (S1130).

When u<LM (S1130—NO), the restriction object value u is set as the output y as it is (i.e., without restriction (S1140)), and when u≥LM (S1130—YES), the guard value LM is set as the output y (S1150).

<Effect>

According to the present embodiment, the same operation effect as the eighth embodiment is achieved.

Tenth Embodiment

Since the basic configuration of the present embodiment is the same as the eighth embodiment, the description of the present embodiment is focused on the difference between the two.

According to the eighth embodiment, the intervention detector 40a calculates the intervention coefficients α and β according to the steering torque Ts.

Figure 29:
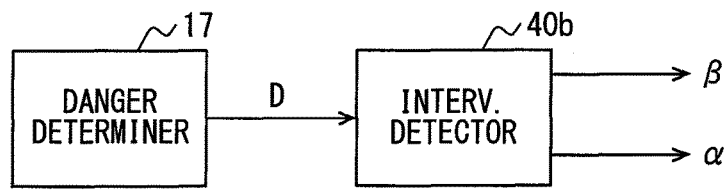
FIG. 29 is a block diagram of the intervention detector and a pre-process in the tenth embodiment of the present disclosure.

On the other hand, in the present embodiment, as shown in FIG. 29, the intervention detector 40b generates the intervention coefficients α and β according to a degree of danger D representing a determined result of a danger determiner 17.

<Danger Determiner>

The danger determiner 17 calculates the degree of danger D based on travel safety related information obtained from the publicly-known in-vehicle system and in-vehicle sensors, such as a stop control execution request flag, a rain determination by a rain sensor, an illumination determination by an illumination sensor and the like.

There are various techniques for calculating the degree of danger D, and how such calculation technique is employed is not specified in the present embodiment (i.e., is arbitrarily determined).

The degree of danger D is an index that is defined to represent a lower safety when taking a greater value.

<Intervention Detector>

Figure 30:
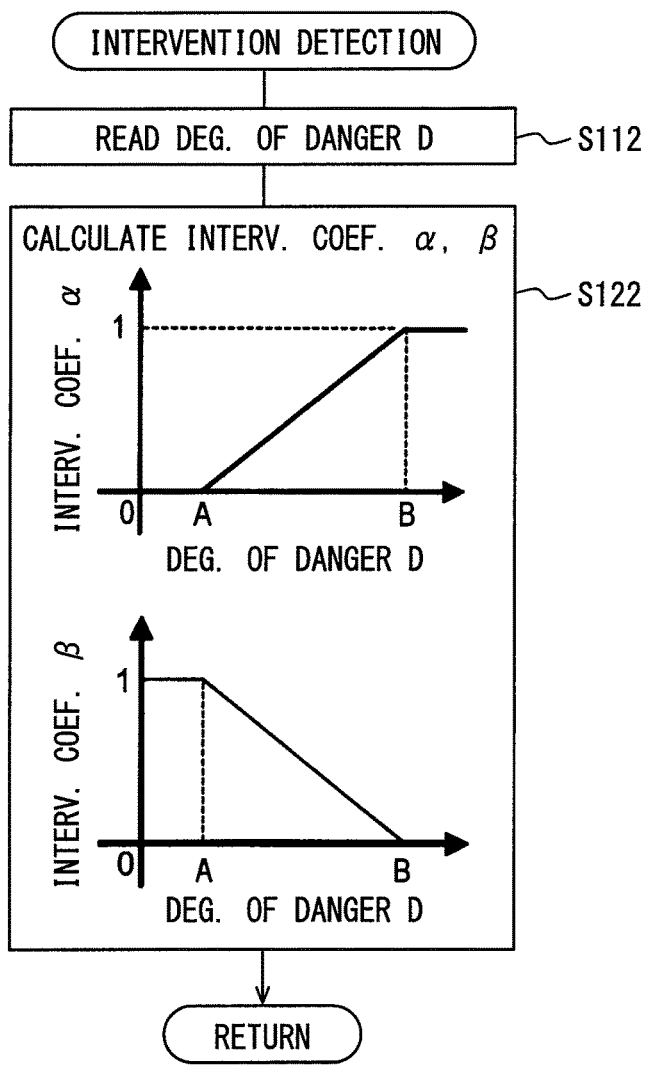
FIG. 30 is a flowchart of a process performed by the intervention detector in the tenth embodiment of the present disclosure.

As shown in FIG. 30, the intervention detector 40b first reads the degree of danger D (S112), and calculates the intervention coefficients α and β according to the degree of danger D read in the above with the help of the conversion table that is prepared in advance (S122).

Then, the intervention detector 40b supplies the intervention coefficient α to the target follow control calculator 30, and supplies the intervention coefficient β to the assist control calculator 20a.

Here, the conversion table used for the calculation of the intervention coefficient α is basically the same as the one described for the intervention detector 40a, except for the following (i.e., the degree of danger D replacing the absolute value of the steering torque |Ts| and the characteristics of the intervention coefficients α and β being mutually interchanged).

That is, the intervention detector 40b generates the intervention coefficient α taking a greater value as the degree of danger D increases and generates the intervention coefficient β taking a smaller value as the degree of danger D increases.

<Operation>

In the electric steering system 1 having such an intervention detector 40b, when the driver is performing the steering operation, if the degree of danger D is D≤A, the intervention coefficients α and β are respectively set to α=1 and β=0, which means that no system intervention is performed and only the assist control is performed.

If the degree of danger D is A<D<B, the intervention coefficients α and β are respectively set as a value between 0 and 1 according to the degree of danger D. However, the relationship of α+β1 is maintained. That is, as the degree of danger D increases, a ratio of the automatic steering torque generated by the target follow control increases against the assist torque generated by the assist control, thereby increasing the system intervention in the driver's steering operation.

If the degree of danger D is D≥B, the intervention coefficients α and β are respectively set to α=0 and β=1, which means that an intervention of the driver is difficult and only the target follow control is performed.

That is, by performing the above-described control, it is difficult for the driver to perform a steering operation that may increase the degree of danger D.

<Effect>

According to the present embodiment, the restriction of the assist instruction AC and the restriction of the follow instruction TC are performed in a mutually-dependent manner (i.e., are associated with each other). Therefore, a system delivering a wrong driving feel by intervening in the driver's operation is realized. In addition, since the range of a drive instruction DC, which is an addition of the assist instruction AC and the follow instruction TC, is also restricted, the capacity of the motor 6 is maximized.

Here, in the present embodiment, the intervention detector 40b is described as generating both of the intervention coefficients α and β, based on an assumption that the configuration is basically the same as the eighth embodiment. However, the configuration may also be based on the first to seventh embodiments, and only the intervention coefficient α may be generated based on such an assumption.

Eleventh Embodiment

The present embodiment has the same basic configuration as the eighth embodiment. Thereby, the description of the present embodiment is focused on the difference between the two.

In the eighth embodiment, the intervention detector 40a calculates the intervention coefficient α according to the steering torque Ts.

Figure 31:
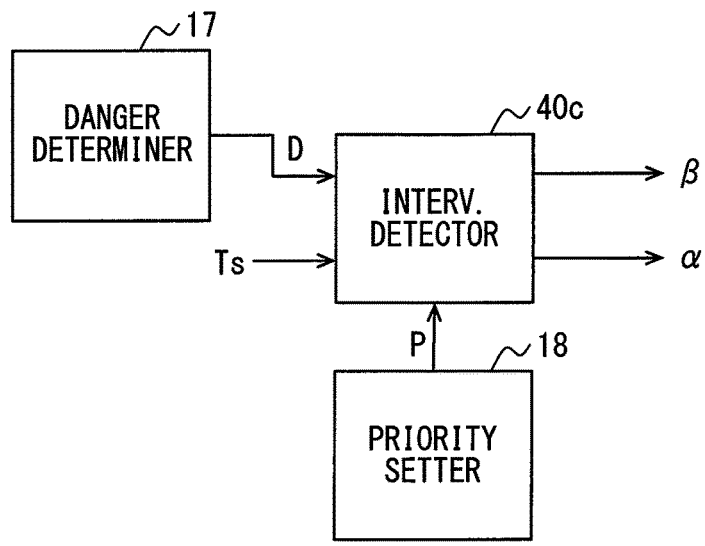
FIG. 31 is a block diagram of the intervention detector and a pre-process in the eleventh embodiment of the present disclosure.

On the other hand, in the present embodiment, as shown in FIG. 31, the intervention detector 40c generates the intervention coefficients α and β based on the steering torque Ts, the degree of danger D which is a determination result of the danger determiner 17, and a priority P, which is a setting by a priority setter 18.

The danger determiner 17 is the same as the one described in the tenth embodiment. Therefore, no description is provided in the present embodiment about the danger determiner 17.

<Priority Setting Part>

The priority setter 18 sets the priority P (i.e., a degree of priority) regarding how much degree either the manual steering by the driver (i.e., the assist control) or the automatic steering by the system (i.e., the target follow control) is prioritized over the other. The priority P may be a fixed value, or may be a variable based on a change speed of the degree of danger D and/or a motor speed β). The priority P is within a range between 0 and 1 (i.e., 0≤P≤1), and, the greater the value of P is, the more prioritized the driver operation is.

<Intervention Detector>

Figure 32:
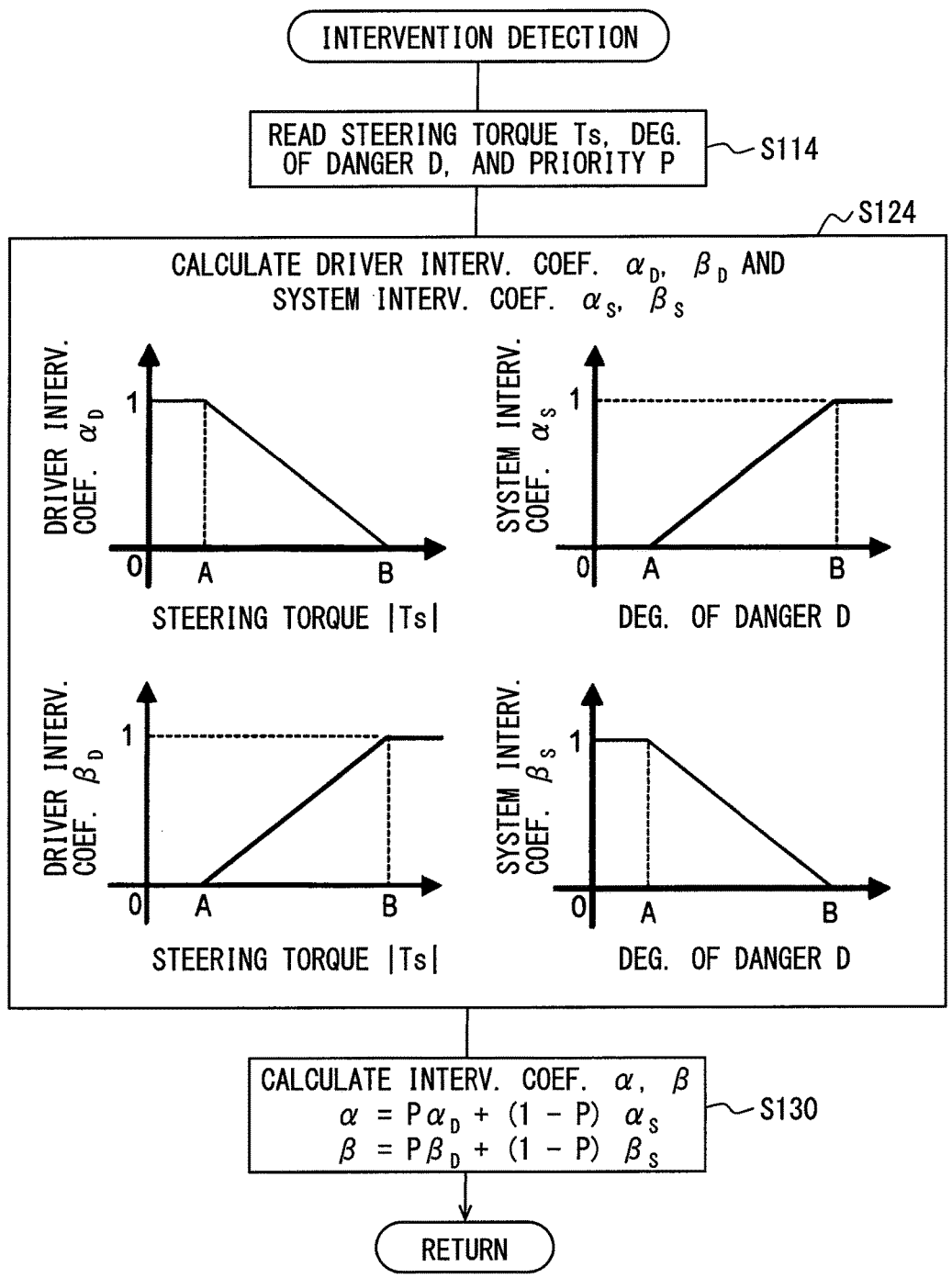
FIG. 32 is a flowchart of a process performed by the intervention detector in the eleventh embodiment of the present disclosure.

The intervention detector 40c reads the degree of danger D and the priority P (S114), as shown in FIG. 32.

Then, according to the conversion table prepared in advance, the intervention detector 40c calculates driver intervention coefficients $\alpha_D$, $\beta_D$ according to the steering torque Ts and system intervention coefficients $\alpha_S$, $\beta_S$ according to the degree of danger D (S124).

The conversion table used for the calculation of the driver intervention coefficients $\alpha_D$, $\beta_D$ is the same as that of the intervention coefficient α in the eighth embodiment (refer to FIG. 22), and the conversion table used for the calculation of system intervention coefficients $\alpha_S$, $\beta_S$ is the same as that of the intervention coefficient α in the tenth embodiment (refer to FIG. 30). In other words, the greater the absolute value of the steering torque |Ts| is, the smaller the driver intervention coefficient $\alpha_D$ is and the greater the driver intervention coefficient $\beta_D$ is, and, the greater the degree of danger D is, the greater the system intervention coefficient $\alpha_S$ is and the smaller the system intervention coefficient $\beta_S$ is.

Then, the intervention detector 40c calculates the intervention coefficient α according to the driver intervention coefficient $\alpha_D$, the system intervention coefficient $\alpha_S$, and the priority P (S130), by using equations 1 and 2.

$$\alpha = P\alpha_D + (1-P)\alpha_S \quad \text{(Equation 1)}$$

$$\beta = P\beta_D + (1-P)\beta_S \quad \text{(Equation 2)}$$

Then, the intervention detector 40c supplies the intervention coefficient α to the target follow control calculator 30 and supplies the intervention coefficient β to the assist control calculator 20a.

<Effect>

According to the present embodiment, since the driver intervention and the system intervention are arbitrated by using the priority P, the switching between the assist control and the target follow control is seamlessly performed, without leaving a wrong feeling for the driver.

Twelfth Embodiment

The present embodiment has the same basic configuration as the first embodiment, thereby the description of the fifth embodiment is focused on the difference between the two.

According to the first embodiment, the intervention detector 40 calculates the intervention coefficient α from the steering torque Ts by using a single conversion map.

On the other hand, in the present embodiment, the conversion map is switched between two cases (i.e., for the driver intervention at a time of switching from the target follow control to the assist control, and for the system intervention, at a time of switching from the assist control to the target follow control).

<Intervention Detector>

Figure 33:
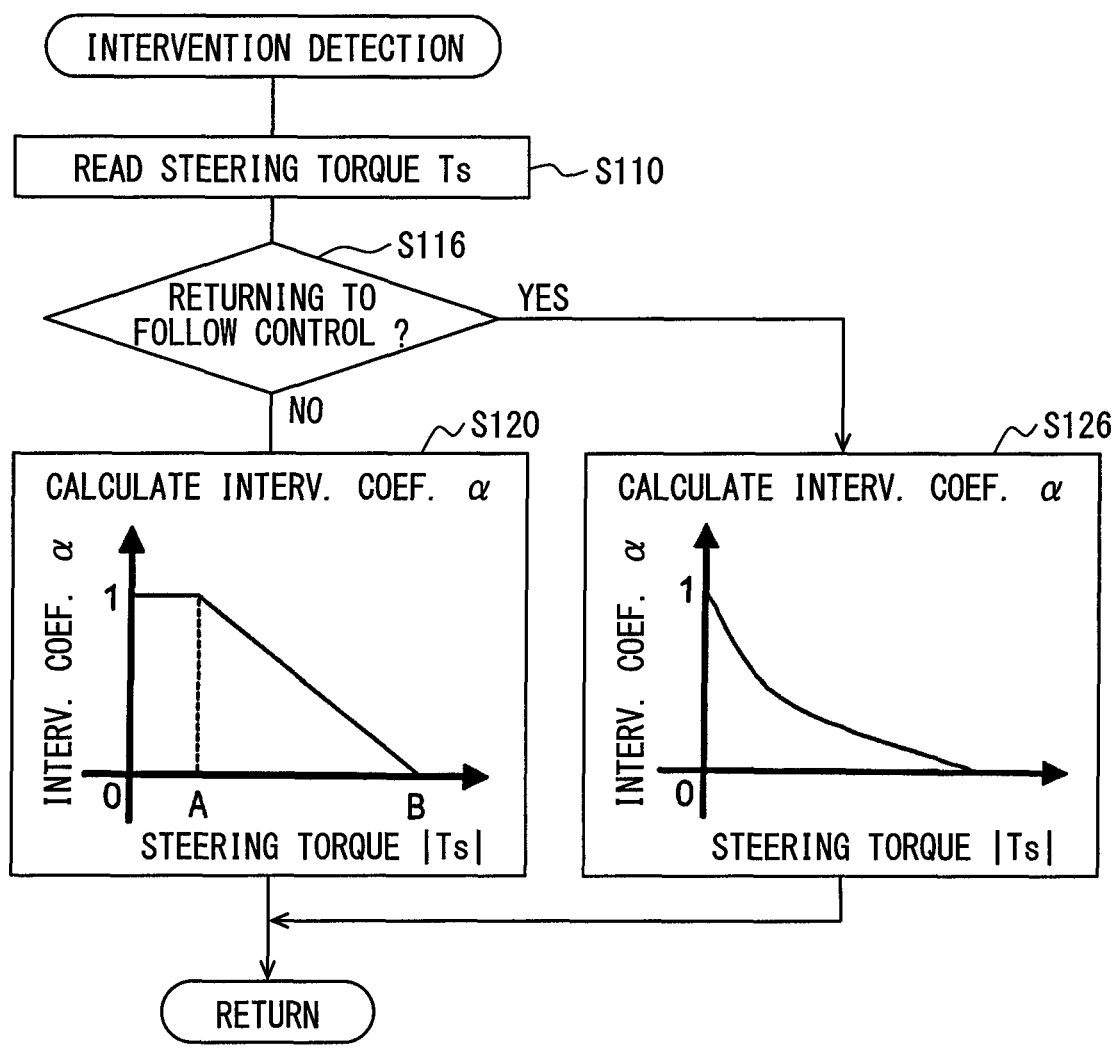
FIG. 33 is a flowchart of a process performed by the intervention detector in a twelfth embodiment of the present disclosure.

As shown in FIG. 33, first, the intervention detector 40 reads the steering torque Ts (S110), and determines whether a control state of the assist control and the target follow control is returning to the target follow control (S116).

The determination about the returning to the target follow control is performed based on, for example, a sign inversion timing when a sign of a differentiation value (i.e., a change speed) of the torque Ts detected by the torque sensor 4 is inverted, or a control switch timing when the restriction by the restriction computer 34 is switched from no restriction to restriction (e.g., in FIG. 5, YES of S230 is switched to NO, and S330 in FIG. 9, S430 in FIG. 11, S530 in FIG. 13, S630 in FIG. 15, S830 in FIG. 18, and S930 in FIG. 20), or more practically, a preset period of time after the sign inversion timing or the control switch timing (e.g., couple of seconds to dozens of seconds).

When it is determined that the control state is not returning to the target follow control (S116—NO), the intervention detector 40 calculates the intervention coefficient α according to a prepared-in-advance normal conversion table (S120). The conversion table in this case is the same as that used in the first embodiment (refer to FIG. 3).

On the other hand, when it is determined that the control state is returning to the target follow control (S116—YES), the intervention coefficient α is calculated according to a prepared-in-advance returning control conversion table based on the steering torque Ts read in S110 (S126).

Then, the intervention detector 40 supplies the intervention coefficient cc calculated in S120 or S126 to the target follow control calculator 30.

Here, the conversion table for the returning is α=1 when |Ts|=0, α=0 when |Ts|≥B, or, in a range of 0<|Ts|<<B, the value a increases exponentially or in an inversely-proportional manner as the value |Ts| decreases.

That is, when a control state in which the assist control by the driver intervention is prioritized is returning to the target follow control due to the release from the assist control, the absolute value of the steering torque |Ts| changes to have a smaller value. At such time, by using the conversion table for the returning, the increase of the intervention coefficient α becomes less steep than by using the normal conversion table.

<Effect>

According to the present embodiment, the returning to the highly-responsive target follow control is performed gently or non-steeply, a steep automatic steering toward the target value of the target follow control is suppressed, and the switching to the target follow control from the assist control is enabled without leaving a wrong feeling for the driver.

Thirteenth Embodiment

The present embodiment has the same basic configuration as the twelfth embodiment, thereby the description of the present embodiment is focused on the difference between the two.

In the twelfth embodiment, when returning to the target follow control, the intervention detector 40 calculates the intervention coefficient α from the steering torque Ts by using a conversion map for a return control, which is different from a normal conversion map.

On the other hand, in the present embodiment, instead of switching the conversion map, the calculated intervention coefficient α based on a conversion map is further passed to a low pass filter, which achieves the same effect as the conversion map for the return control.

<Intervention Detector>

Figure 34:
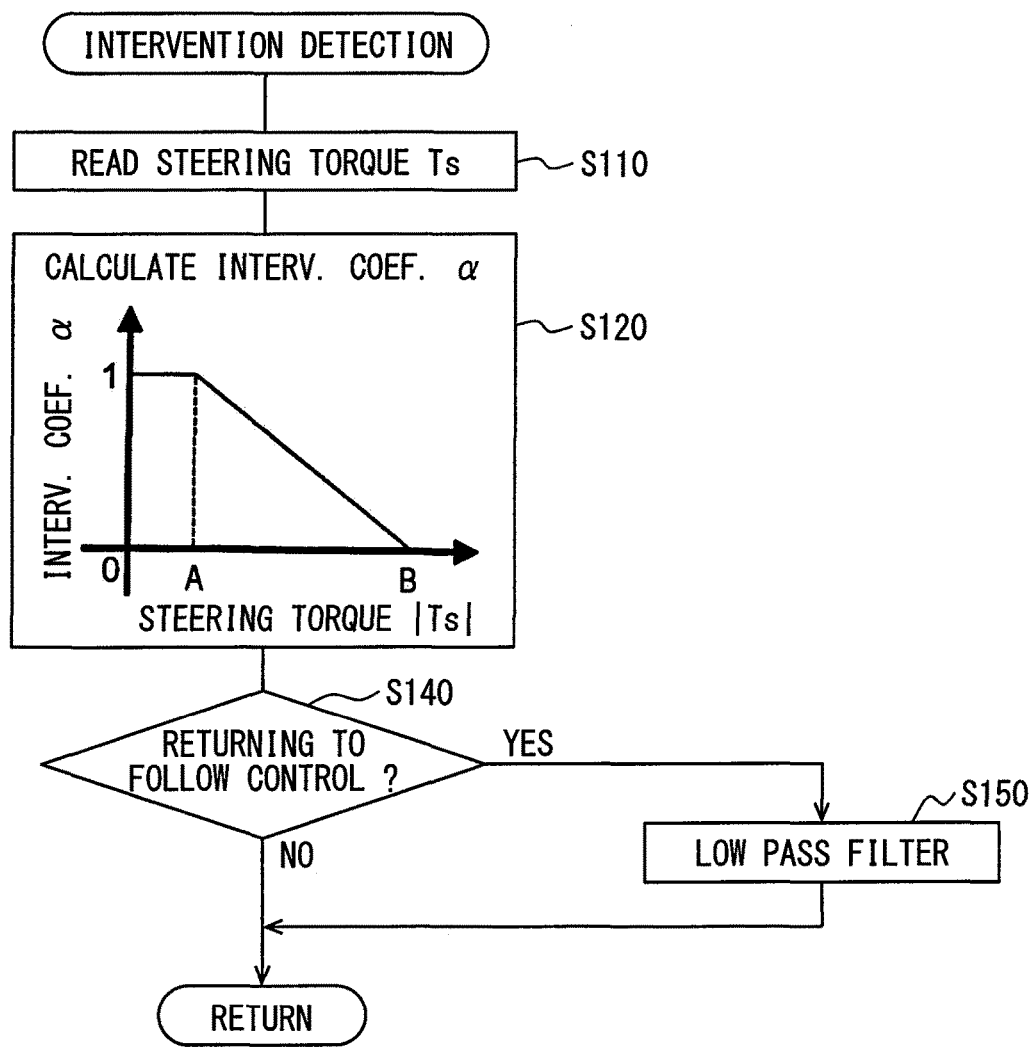
FIG. 34 is a flowchart of a process performed by the intervention detector in a thirteenth embodiment of the present disclosure.

As shown in FIG. 34, the intervention detector 40 reads the steering torque Ts (S110), and calculates the intervention coefficient α according to the steering torque Ts read in S110 by using the conversion table prepared in advance (S120).

The control state of the assist control and the target follow control is then determined whether the control state is returning to the target follow control (S140). The determination of whether the control state is returning to the target follow control is the same as that of the process in S116 of the twelfth embodiment.

When it is determined that the control state is not returning to the target follow control (S140—NO), the calculation result of S120 is outputted as is (i.e., without change as the intervention coefficient α as it is).

When it is determined that the control state is returning to the target follow control (S140—YES), the calculation result of S120 is further passed on to the low pass filter, and an output from the low pass filter is used as the intervention coefficient α (S150).

The low pass filter has a cut-off frequency of 0.1 Hz or the like, which represents an average steering speed of the drivers.

<Effect>

According to the present embodiment, the number of conversion maps is reduced in comparison to the twelfth embodiment. Therefore, the same effect is achieved with a decreased calculation load.

The cut-off frequency of the low pass filter may be changed according to the degree of danger D described by the tenth embodiment etc., for example. More specifically, the cut-off frequency may be raised as the degree of danger D increases. Further, when the degree of danger D takes the maximum value, the low pass filtering may be skipped. In such manner, when the vehicle is in a dangerous state in which the avoidance of the danger by the steering operation of the driver is difficult, the control is quickly returned to the target follow control.

OTHER EMBODIMENTS

As mentioned above, although the embodiments of the present disclosure are described, various modifications and other schemes may also be included in the embodiments of the present disclosure.

(1) Although the lane keeping control is performed as the target follow control in the above-mentioned embodiment, other controls for generating the automatic steering torque may also be performable by the present disclosure. For example, the control may also be based on the motor rotation angle, the steering rotation angle, a detection value from a yaw rate sensor, a deviation between the tire steer angle and a target steer angle, a lateral deviation of position between a target position and a detected position from a camera, a laser radar, a millimeter wave radar or the like, a deviation between a target locus and a detected locus from GPS or the like, a deviation of curvature between a target value and an actual road curvature or the like.

(2) According to the above-mentioned embodiment, although the driver intervention is detected based on a steering torque (i.e., based on an output of the torque sensor), the driver intervention may be detected differently. For example, the driver intervention may be detected based on a deviation between the target value and the detection value in the target follow control, or based on a combination of such deviation and at least one of the motor rotation angular speed and the output of the torque sensor, etc.

(3) A function of one element may be distributively provided by two or more elements, or a function provided by many elements may be integrally provided by one element. Further, a part of the configuration in the above embodiment may be replaced with a function of a well-known configuration. Further, a part of the configuration in the above embodiment may be added to or replaced with the configuration in other embodiments in the above.

What is claimed is:

1. A motor controller comprising:
an assist controller generating an assist instruction to generate an assist torque that lightens a manual steering load based on a detected value of a steering torque;
a follow controller obtaining a target value of a physical quantity of a steering operation and controlling a detected value of the physical quantity to follow the target value, wherein following the target value is achieved by sending a follow instruction to a motor which outputs an auto-steering torque from the motor;

a motor driver driving the motor, according to a summation value of the assist instruction and the follow instruction, to generate the assist torque and the auto-steering torque;

an intervention detector detecting a driver intervention during a follow control or detecting a system intervention in an assist control by a system that is involved in a generation of the target value of the physical quantity; and a restrictor restricting an internal value of at least one of the assist controller and the follow controller, according to a degree of the driver intervention detected by the intervention detector, wherein the restriction of the internal value causes a change of a ratio comprised of the assist torque versus the auto-steering torque such that a magnitude of the assist torque generated from the motor varies relative to a magnitude of auto-steering torque generated from the motor when a driver intervention or a system intervention is detected.

2. The motor controller of claim 1, wherein the intervention detector detects the driver intervention in the follow control, and the restrictor restricts the internal value in a manner in which, the ratio of the assist torque against the automatic steering torque is increased accordingly, when the degree of the driver intervention in the follow control detected by the intervention detector increases.

3. The motor controller of claim 1, wherein the intervention detector detects a system intervention in the assist control, and the restrictor restricts the internal value in a manner in which, a ratio of the automatic steering torque against the assist torque is increased accordingly, when a degree of the system intervention in the assist control that is detected by the intervention detector increases.

4. The motor controller of claim 1, wherein the intervention detector detects both of a driver intervention that intervenes in the follow control and a system intervention that intervenes in the assist control, the restrictor restricts the internal value in a manner in which, a ratio of the assist torque against the automatic steering torque is increased accordingly, when a degree of the driver intervention in the follow control that is detected by the intervention detector increases, and a ratio of the automatic steering torque against the assist torque is increased accordingly, when a degree of the system intervention in the assist control that is detected by the intervention detector increases.

5. The motor controller of claim 2, wherein the restrictor restricts the summation value of the assist instruction and the follow instruction to be within a motor control allowable range to control the motor.

6. The motor controller of claim 2, wherein the restrictor sets an allowable range of the internal value according to a degree of intervention detected by the intervention detector, and restricts the internal value to take a value within the allowable range.

7. The motor controller of claim 2, wherein the restrictor restricts the internal value by multiplying an intervention coefficient that represents a degree of intervention detected by the intervention detector to the internal value.

8. The motor controller of claim 6, wherein the follow controller includes:

a deviation calculator calculating a deviation between the target value and the detected value of the physical quantity;

a characteristic determiner determining a control characteristic based on an output value of the deviation calculator; and an integrator integrating an output value of the characteristic determiner and generating the follow instruction, and the restrictor restricts at least one of the target value of the physical quantity, the detected value of the physical quantity, the output value of the deviation calculator, the output value of the characteristic determiner, the integral value of the integrator, and a previous value of the integral value that is added to the output value of the characteristic determiner, when the integrator integrates the deviation.

9. The motor controller of claim 6, wherein the follow controller includes:

a deviation calculator calculating a deviation between the target value and the detected value of the physical quantity;

a proportional value generator generating a proportional value that is proportional to the deviation;

an integral value generator generating an integral value of the deviation;

a differential value generating a differential value of the deviation; and an adder adding the proportional value, the integral value, and the differential value, and generating the follow instruction, and the restrictor restricts the proportional value, the integral value, and an internal value of the integral value generator.

10. The motor controller of claim 2, wherein the follow controller includes:

a deviation calculator calculating a deviation between the target value and the detected value of the physical quantity;

a characteristic determiner determining a control characteristic based on an output value of the deviation calculator; and an integrator integrating an output value of the characteristic determiner and generating the follow instruction, and the restrictor includes:

a post-process restrictor setting an allowable range of the follow instruction according to a degree of intervention of the driver that is detected by the intervention detector, and restricting an output of the integrator so that the follow instruction takes a value within the allowable range; and a pre-process restrictor restricting, when the follow instruction is equal to or greater than a guard value that represents a boundary of the allowable range, either of the target value of the physical quantity, the detected value of the physical quantity, the output value of the deviation calculator, or the output value of the characteristic determiner.

11. The motor controller of claim 2, wherein
the restrictor restricts the assist instruction that is output from the assist controller.

12. The motor controller of claim 2, wherein the restrictor decreases the automatic steering torque according to the degree of the driver intervention.

13. The motor controller of claim 1, wherein the assist controller and the intervention detector increases the assist torque according to the degree of the driver intervention.

14. The motor controller of claim 1, wherein the change of the ratio of the assist torque against the auto-steering torque causes the auto-steering torque to be adjusted such that a driver intervention torque is greater than the auto-steering torque when the driver intervention during the follow control is detected.

* * * * *